United States Patent [19]

Takeuchi et al.

[11] Patent Number: 4,832,170
[45] Date of Patent: May 23, 1989

[54] PALLET CHANGER

[75] Inventors: Hirosato Takeuchi; Osahiko Miyazaki; Yasuo Kazama; Naoya Kurihara, all of Tokyo, Japan

[73] Assignee: Nitto Kohki Co., Ltd., Tokyo, Japan

[21] Appl. No.: 103,420

[22] Filed: Oct. 1, 1987

[30] Foreign Application Priority Data

| Oct. 4, 1986 | [JP] | Japan | 61-236644 |
| Oct. 30, 1986 | [JP] | Japan | 61-256908 |
| Oct. 30, 1986 | [JP] | Japan | 61-256909 |

[51] Int. Cl.$^4$ ............................ B65G 47/00
[52] U.S. Cl. ..................... 198/346.1; 198/465.1; 198/465.3; 198/369; 29/33 P
[58] Field of Search ........... 198/346.1, 465.1–465.3, 198/369, 345; 29/33 P, 563, 568; 414/222, 223

[56] References Cited

U.S. PATENT DOCUMENTS 4,291,797  9/1981  Ewertowski ............... 29/33 P
4,705,445  11/1987  Morita et al. .............. 198/346.1
4,717,306  1/1988  Satake ....................... 198/345

Primary Examiner—Joseph E. Valenza
Attorney, Agent, or Firm—Nixon & Vanderhye

[57] ABSTRACT

A pallet changer has a pallet support rotatably provided on a bed and a plurality of pallet inlet/outlets disposed on the edges of the pallet support at regular intervals. Positioning pins are biased such that they project from the bed toward the pallet support. Stops are provided on the pallet support and are engaged with the positioning pins, when the pallet support is turned through an angle corresponding to the angular distance between adjacent pallet inlet/outlets. A control mechanism is provided such that when a pallet is transferred to the pallet support through one of the pallet inlet/outlets, the positioning pin is held disengaged from the corresponding stop until the pallet support is rotated to the next stop position.

6 Claims, 18 Drawing Sheets

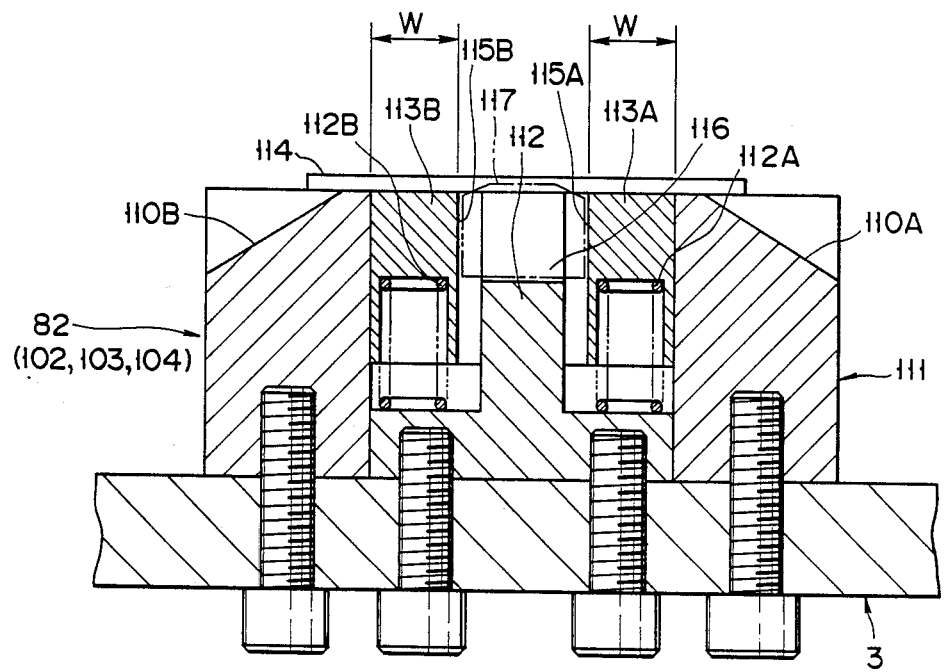
F I G. 9

PALLET CHANGER

BACKGROUND OF THE INVENTION

This invention relates to a pallet changer for changing pallets between a machine tool and a pallet stocker and, more particularly, to a pallet changer of the type having improved operability in changing pallets.

In order to improve the efficiency of mounting and removing work on and from a work table in a numerically controlled machine tool such as a machining center, pallets are used for mounting work. Pallet changers have been used for changing or transporting pallets between a work table and a stocker and also handling pallets in a machine tool. This pallet changer has a pallet support, which is rotatable between the work table of a machine tool and a pallet stocker such as a pallet transporter or a preparation station, at which a work is mounted on and removed from a pallet. A pallet, on which a work to be machined, is transferred from the pallet stocker to the pallet support through one of the inlet/outlets of the pallet support so as to be ready for being transferred to the work table or machine tool. After the machining is completed, the pallet, on which the machined work is mounted, is transferred from the work table of the machine tool to the pallet support through the other inlet/outlet. Subsequently, the pallet support is rotated to transfer the pallet with the machined work mounted thereon to the pallet stocker or change the machined work on the pallet with a new work to be machined while transferring the pallet with the work to be machined to the work table of the machine tool.

In such a prior art pallet changer, when transferring a pallet between the work table and pallet stocker or between the pallet support and machine tool, it is necessary to position the pallet support by stopping the rotation thereof at a position, at which the pallet inlet/outlets of the pallet support face the work table and pallet inlet/outlet of the pallet stocker or machine tool, respectively. For this reason, a positioning mechanism is provided, in which a knock pin is provided such that it can project from and retract into a bed rotatably supporting the pallet support, and a positioning hole, in which the knock pin can be received, is provided in the pallet support at a predetermined position thereof.

For the engagement and disengagement between the receiving hole and knock pin in the positioning mechanism, electric control means is used, in which a controller receives a detection signal provided from detecting means, e.g., a limit switch, for electrically detecting the operation of transferring pallets. By this means, the knock pin is raised and lowered by an exclusive actuator.

However, the pallet changer using such electric control means as noted above, requires electric response time from the transfer of pallet to the start of operation of actuator as well as rather a long time for the start of the actuator. Therefore, the efficiency of the pallet change is inevitably reduced.

Further, in the system using a pallet changer, in addition to change the machined work at the preparation station of the pallet support, it is necessary to transfer the pallet carrying the machined work from the preparation station to the external pallet stocker and receive a new pallet carrying a work to be machined from the pallet stocker. In order to satisfy the above requirements for the pallet changer, it is necessary to newly provide detecting means for detecting the transfer of pallets to be changed at the preparation station of the pallet changer and also change an electric control sequence, which permits rotation of the pallet support as the pallet moved between the machine tool and the pallet support is transferred onto or from the pallet support. This means that it is necessary to change the electric control sequence of permitting the rotation of the pallet support by modifying or changing a sequence control circuit. Therefore, it is impossible to easily obtain the versatility of selecting the function of changing the machined work at the preparation station of the pallet support without transferring pallets, and a function of transferring the pallet with the machined work between the preparation station and external pallet stocker.

Further, some transfer machines include a positioning/releasing unit, which causes an arm rotatably supported on a bed to be rotated upwardly to be held in a predetermined upward position when in use and releases the arm from the upward position to the lower position when the arm no longer needs to be in the upward position. Some other transfer machines are provided with a mechanism for keeping an auxiliary table horizontal with respect to the work table when required. Further transfer machines for supplying articles to be treated to a machine tool or an automatic assembling machine has a very simple construction in which a hook lever for hooking an arm rotatably supported on a bed in a predetermined position is provided on the bed, and the arm is located and released by engaging and disengaging between the hook lever and the arm. With such a structure, however, the hook lever and the arm must be separately operated. Further, since it is necessary to operate the hook lever by a hand, the arm can not be rotated readily and safely if a heavy object is attached to the arm.

SUMMARY OF THE INVENTION

An object of the invention is to provide a pallet changer, which has a mechanical structure and permits speedy, accurate and safe transfer of pallets and also permits change of a work on pallet on a pallet support.

Another object of the invention is to provide a pallet changer, which is provided with a positioning/releasing unit operating accurately and safely.

To attain the above objects, the pallet changer according to the invention is provided with a bed rotatably carrying a pallet support, which has a plurality of pallet inlet/outlets arranged on its edge at regular intervals. A plurality of positioning members are provided at regular intervals on either one of the pallet support and bed such that each of them corresponds to each pallet inlet/outlet and is biased to be displaceable toward the other one of the pallet support and the bed. Stops are provided at regular intervals on the other one of the pallet support and the bed for simultaneously locking the corresponding positioning members to direct the corresponding pallet inlet/outlets in the predetermined directions during rotation of the pallet support. Further, a disengagement control mechanism is provided, which disengages the positioning members from the stops by the pallet transferred from the pallet inlet/outlet to the pallet support, against a biasing force applied to the positioning members, while the positioning members are engaged with the stop, and which also releases the positioning members from the stops engaged therewith and allows the pallet support to rotate until the positioning members reach a position, at which they engage with the next stops.

It is desired that all the positioning members except for at least one be simultaneously engaged with the corresponding stops. At least one positioning member is engaged with and disengaged from a different stop.

Further, the positioning/releasing unit used for the pallet changer according to the invention has an arm rotatably supported on the bed. The arm is formed with an engagement surface, which faces an end portion of the bed at a predetermined distance therefrom so as to form a receiving space with the end portion when the arm is at a predetermined position. A stop lever is rotatably supported on the bed such that it can be inserted into the receiving space to thereby prevent the rotation of the arm in the direction in which the width of the receiving space is reduced. Further, a driven engagement member is provided for rotation together with the stop lever. The driven engagement member rotates the stop lever towards the receiving space according to the rotational displacement of the arm in engagement with a projection of the arm. When the driven engagement member further rotates the arm in the same direction to a predetermined extent from a position, at which the stop lever is pressed against the engagement surface of the arm, the driven engagement member is detached from the projection.

BRIEF DESCRIPTION OF THE DRAWINGS

This invention can be fully understood from the following detailed description with reference to the accompanying drawings, in which:

FIG. 9 is a sectional view of a stop;

DETAILED DESCRIPTION OF THE PREFERRED EMBODIMENTS

Figure 1:
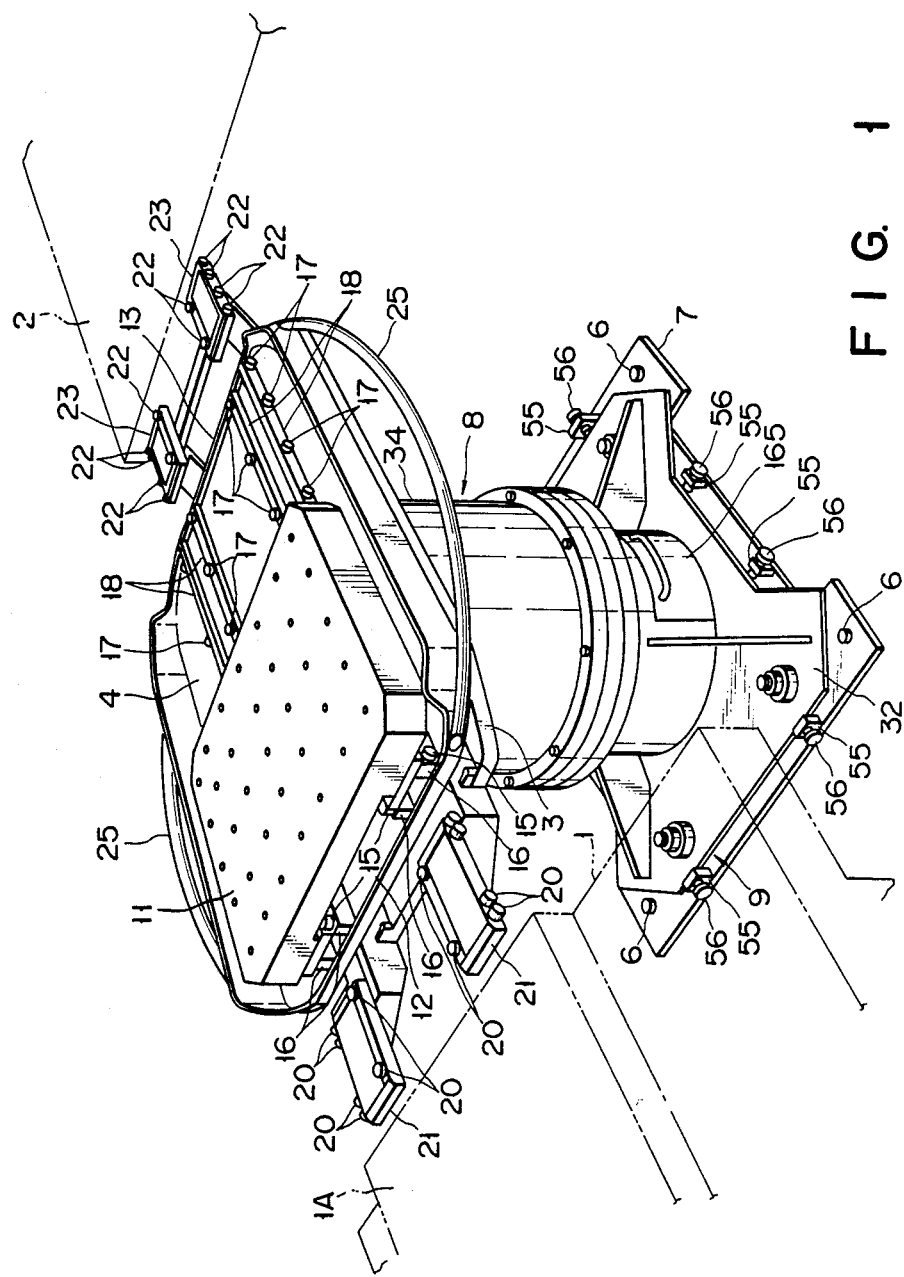
FIG. 1 is a perspective view of an embodiment of a pallet changer according to this invention.

As shown in FIG. 1, a pallet changer is provided between clamper 1A secured onto the upper face of work table 1 of a numerical control machine tool (e.g., a machining center) and pallet stocker 2 (e.g., pallet transporter). Pallet support 4 is rotatably mounted on bed 3 and turned through a predetermined angle so as to transport pallets between clamper 1A and pallet stocker 2. With the pallet changer, a pallet carrying a machined work can be replaced by a new one on the preparation station on pallet support 4.

Clamper 1A (not shown in detail) is used for temporarily positioning pallet 11 transferred from the pallet changer and clamping temporarily positioned pallet 11 in a machining position, at which the work is machined. After the machining has been completed, it releases pallet 11 so that pallet 11 can be transferred to the pallet changer.

The pallet changer will now be described with reference to FIG. 1. By means of setting unit 9 described later, lift 8 is fixed to base 7, which is secured to the floor by anchor bolts 6. Bed 3 is fixed to the top of lift 8. Pallet support 4 is supported horizontally and rotatably on bed 3. When the pallet changer is installed, lift 8 adjusts pallet support 4 to the substantially same height as that of clamper 1A secured on the upper face of work table 1. Setting unit 9 fixes lift 8 to base 7 by after finely adjusting the positions of the pallet changer.

The opposite ends of pallet support 4 constitute respective first and second inlet/outlets 12 and 13, through which pallet 11 is transferred. Two pairs of first rails 16 are laid between first inlet/outlet 12 and the central portion of pallet support 4. First rails 16 are provided with a suitable number of guide rollers 15 for supporting and guiding pallet 11 which is transferred to or from the pallet changer through first inlet/outlet 12. Like the first rails, two pairs of second rails 18 are laid between second inlet/outlet 13 and the central portion of pallet support 4, the second rails being provided with a suitable number of guide rollers 17 for supporting and guiding pallet 11 transferred to or from the pallet changer through second inlet/outlet 13. A pair of bridges 21 are fixed to bed 3 at the end thereof which faces clamper 1A. Bridges 21 have guide rollers 20 for supporting and guiding pallet 11 which is transferred between clamper 1A and pallet support 4. Another pair of bridges 23 are provided at that end of bed 3 which faces pallet stocker 2, these bridges 23 having guide rollers 22 for supporting and guiding pallet 11 transferred between pallet stocker 2 and pallet support 4. Bridges 23 are selectively brought to either substantially horizontal or vertical position by rotary disengagement unit 5 to be described later by a single operation.

For example, where pallet support 4 is disposed as shown in FIG. 1, with first and second inlet/outlets 12 and 13 facing clamper 1A and pallet stocker 2 respectively for changing pallets between the clamper and pallet stocker, a pallet (not shown), on which a work to be machined is mounted, is transferred from pallet stocker 2 through second inlet/outlet 13 to second rails 18 of pallet support 4 and is ready for transport to clamper 1A. Meanwhile, pallet 11, on which a machined work is mounted, is transferred from clamper 1A of the machine tool through first inlet/outlet 12 of pallet support 4 to first rails 16. Pallet support 4 is turned through 180°, and then pallet 11 with the machined work is transferred to pallet stocker 2 and also the pallet with the work to be machined is transferred to clamper 1A secured to work table of the machine tool.

In FIG. 1, the opposite long side edges of pallet support 4 are provided with guards 25 having a radius of curvature substantially equal to the distance from the center of rotation of the pallet support 4 to the corresponding corner thereof. Guards 25 also serve as grips to turn pallet support 4.

Now, the pallet changer will be described in detail.

Figure 2:
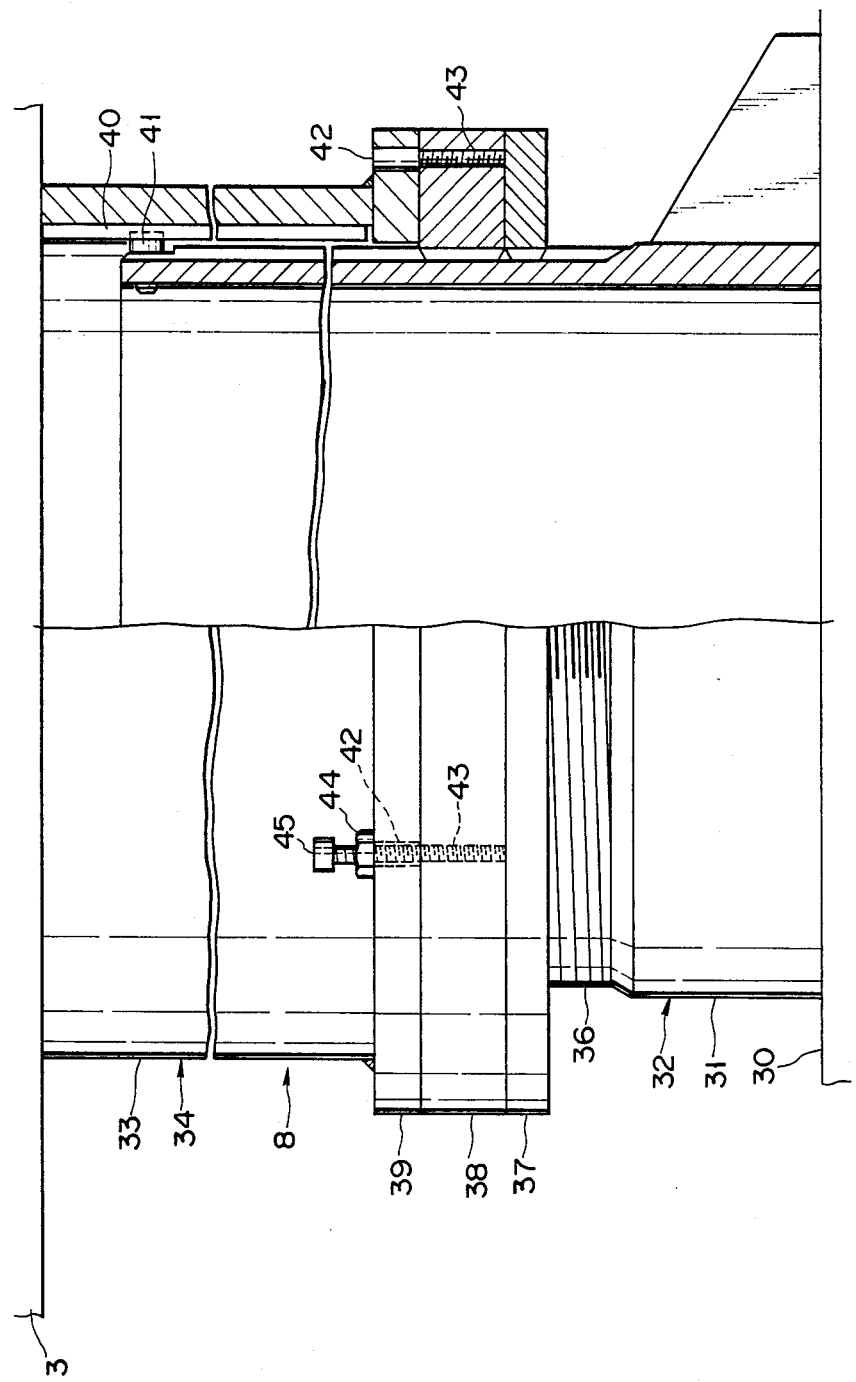
FIG. 2 is a side view, partly in section, showing a lift of the pallet change of FIG. 1.
Figure 3:
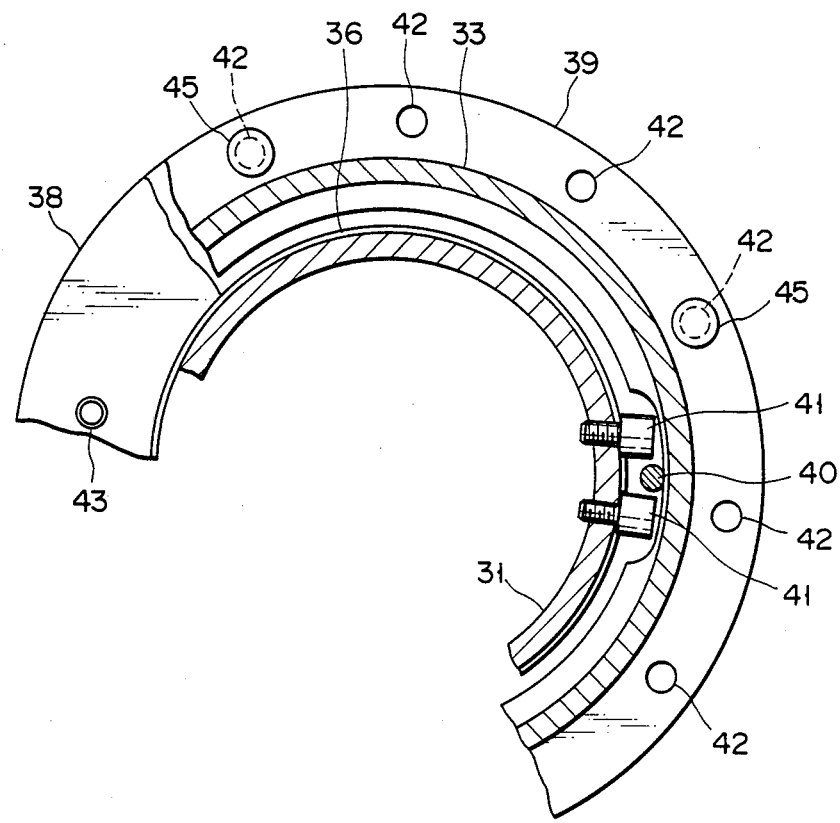
FIG. 3 is a plan view, partly in section, showing the lift of FIG. 2.

Lift 8 will be described with reference mainly to FIGS. 2 and 3.

Lift 8 has a double-drum structure comprising upper body 34 and lower body 32. Lower body 32 has first drum 31 secured to base 30 which can be secured to base 7 by setting unit 9. Upper body 34 has second drum 33 disposed below bed 3 and accommodates second drum 33 with a slight gap therebetween. The upper end portion of first drum 31 is formed with a trapezoidal male screw 36, on which stop ring nut 37 and support ring nut 38 provided thereon are screwed.

Second drum 33 has flange 39 formed at the lower end thereof. Flange 39 is placed on support ring nut 38 such that support upper body 34 is supported on support ring unit 38. Upper body 34 is raised and lowered by turning support ring nut 38. At this time, upper body 34 is not rotated in unison with support ring nut 38. To this end, axially extending rodlike key 40 is fixed on the inner surface of second drum 33, and a pair of guide screws 41 are secured to the upper end of first drum 31 such that key 40 is clamped between the heads of screws 41 and in slidable contact therewith (FIG. 3).

A plurality of (e.g., 12) mounting holes 42 are formed in flange 39 in circumferentially equidistantly spaced relationship. A plurality of (e.g., four) female mounting screws 43 are formed in support ring nut 38 at circumferentially regular intervals so as to align with corresponding mounting holes 42 in flange 39.

When installing the pallet changer, the height level of lift 8 is adjusted so as to set clamper 1A secured to work table 1 at a required height level. To this end, upper body 34 is raised or lowered by turning support ring 38 to set pallet support 4 and clamper 1A to the same level, more accurately to make the surface of guiding and support of pallet 11 defined by guide rollers 15, 17, 20 and 22 align with the supported underface of pallet 11 on clamper 1A. After the height level of upper body 34 has been set, four mounting female screws 43 formed on support ring nut 38 are brought into alignment with the corresponding four of twelve mounting holes 42 formed in flange 39 of upper body 34 by slightly turning support ring nut 38. Set screws 45 with lock nuts 44 are inserted in mounting holes 42 and engaged with female screws 43. Subsequently, the bottom of support ring nut 38 is urged against stop ring nut 37 by turning stop ring nut 37. While maintaining this state, set screws 45 are tightened until the tips of set screws 45 are pressed against stop ring nuts 37. Subsequently, lock nuts 44 are tightened to lock screws 45. In this way, upper body 34 is completely coupled to lower body 32.

With the double-drum structure of lift 8 comprising and lower bodies 34, 32 having a comparatively large diameter, it can stably support the upper structure. Also, the pitch circle diameter of trapezoidal screw 36 formed in lower body 32 can be increased. Thus, the adjustment of the height level of upper body 34 with respect to lower body 32 can be done very accurately.

In order to align mounting holes 42 with mounting female screws 43, the maximum angle through which supporting nut 38 can be rotated is one half of the angle (15° in this embodiment) defined between the adjacent mounting holes 42 with respect to the center of supporting ring nut 38. Therefore, the maximum error, permissible in the height level of upper body 34, as a result of this alignment is only 1/24 of one pitch of trapezoidal screw 36. It is thus possible to cancel errors through fine adjustment of the horizontal state, height level and position in the horizontal plane by means of setting unit 9.

Figure 4:
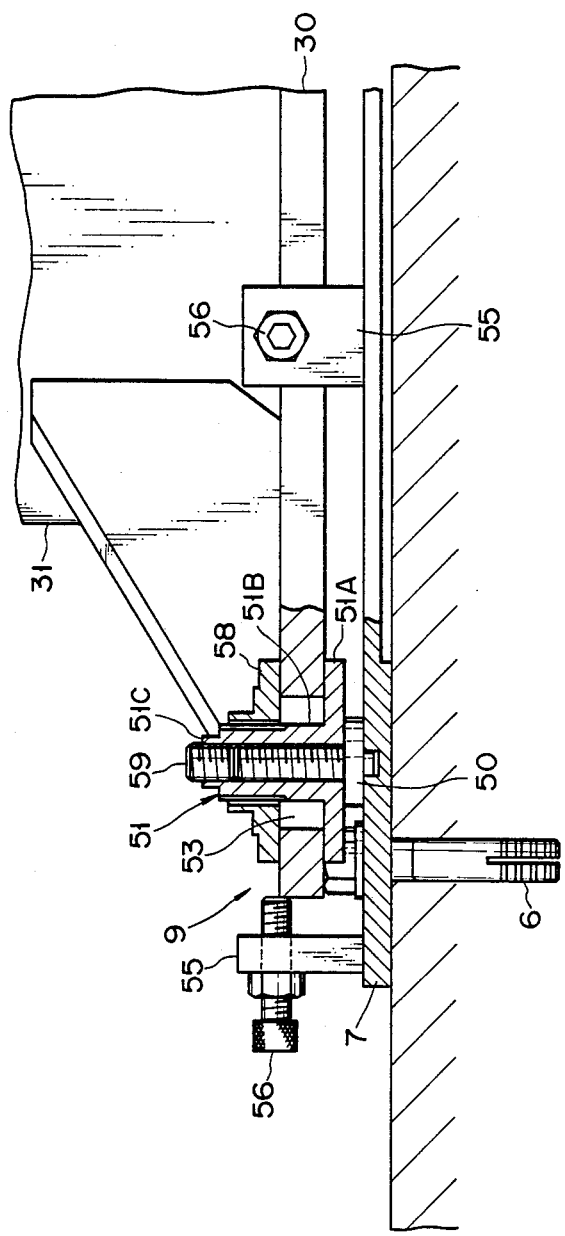
FIG. 4 is a side view, partly in section, showing an installer installing unit of the pallet changer of FIG. 1.
Figure 5:
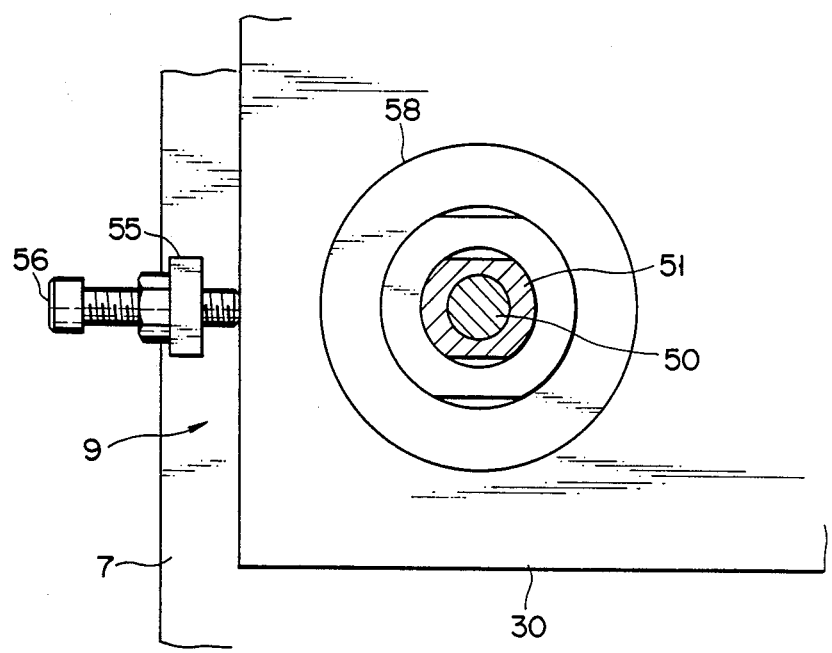
FIG. 5 is a plan view, partly in section, showing the installer of FIG. 4.

Now, setting unit 9 will be described, with reference to FIGS. 4 and 5.

Base 7 is provided with four studs 50 at the corners. Height adjuster 51 is screwed on the respective stud 50 with flange portion 51A. Base 30 located at the bottom of lift 8 has four through holes 53 which align with studs 50 and have a diameter smaller than the outer diameter of flange portion 51A of height adjuster 51. Bosses 51B of height adjusters 51 are inserted in holes 53, and base 30 is set on the upper faces of flange portions 51A of height adjusters 51. When height adjuster 51 is turned at its head portion 51C, height adjuster 51 is moved vertically. Thus, it is possible to finely adjust the horizontal state and height level of lift 8 and pallet support 4 by four height adjusters 51.

Fixed to each edge of base 7 are two blocks 55 at a predetermined interval (FIG. 1). Push screw 56 is screwed in each block 55 such that it pushes the corresponding end face of base 30. As the tip of push screw 56 to project gradually toward base 30 by turning the same, base 30 slides on the upper face of flange portion 51A of height adjuster 51 within the range defined by the gap between the inner wall of hole 53 and outer wall of boss 51B of height adjuster 51. The lengthwise and transverse positions (i.e., the position in the horizontal plane) of pallet support 4 with respect to base 7 is finely adjusted by rotating push screws 56.

On boss 51B of each height adjuster 51 is screwed lock nut 58, having a substantially equal outer diameter to that of flange portion 51A, so that a portion of base 30 surrounding hole 53 is held between flange portion 51A and lock nut 58. Also, set screw 59 is screwed in height adjuster 51 to push the head of stud 50.

After the height of lift 8 has been set, the position in the horizontal plane and the state of horizon of pallet support 4 and height level of the same roughly set by lift 8 are finely adjusted by setting unit 9. Thus, the installation of lift 8 on base 7 is completed. The state of horizon, height position and position in the horizontal plane of pallet support 4 are finely adjusted by turning each height adjuster 51 and push screw 56. Then, the head of stud 50 is urged by set screw 59 to prevent the rotation of height adjuster 51 with respect to stud 50. Thereafter, base 30 is held between flange portion 51A and lock nut 58 by turning lock nut 58 in the clamping direction. Thus, lift-8 is fixed to base 7 such that it maintains the finely adjusted height level and the position in the horizontal plane. Thus, pallet changer is firmly connected to base 7 which is fixed to the floor by anchor bolts 6, whereby the installation position of the pallet changer never changes even if it receives shocks and vibrations.

A positioning mechanism and control mechanism 10 will be described.

The positioning mechanism sets pallet support 4 in position with respect to pallet stocker 2 and clamper 1A when pallets are transferred between clamper 1A secured to the upper face of work table 1 and pallet stocker 2 after turning pallet support 4. Control mechanism 10 controls the positioning mechanism in a mechanically sequential manner such that pallet support 4 is operated in accordance with the transferring steps of pallet 11.

Figure 6:
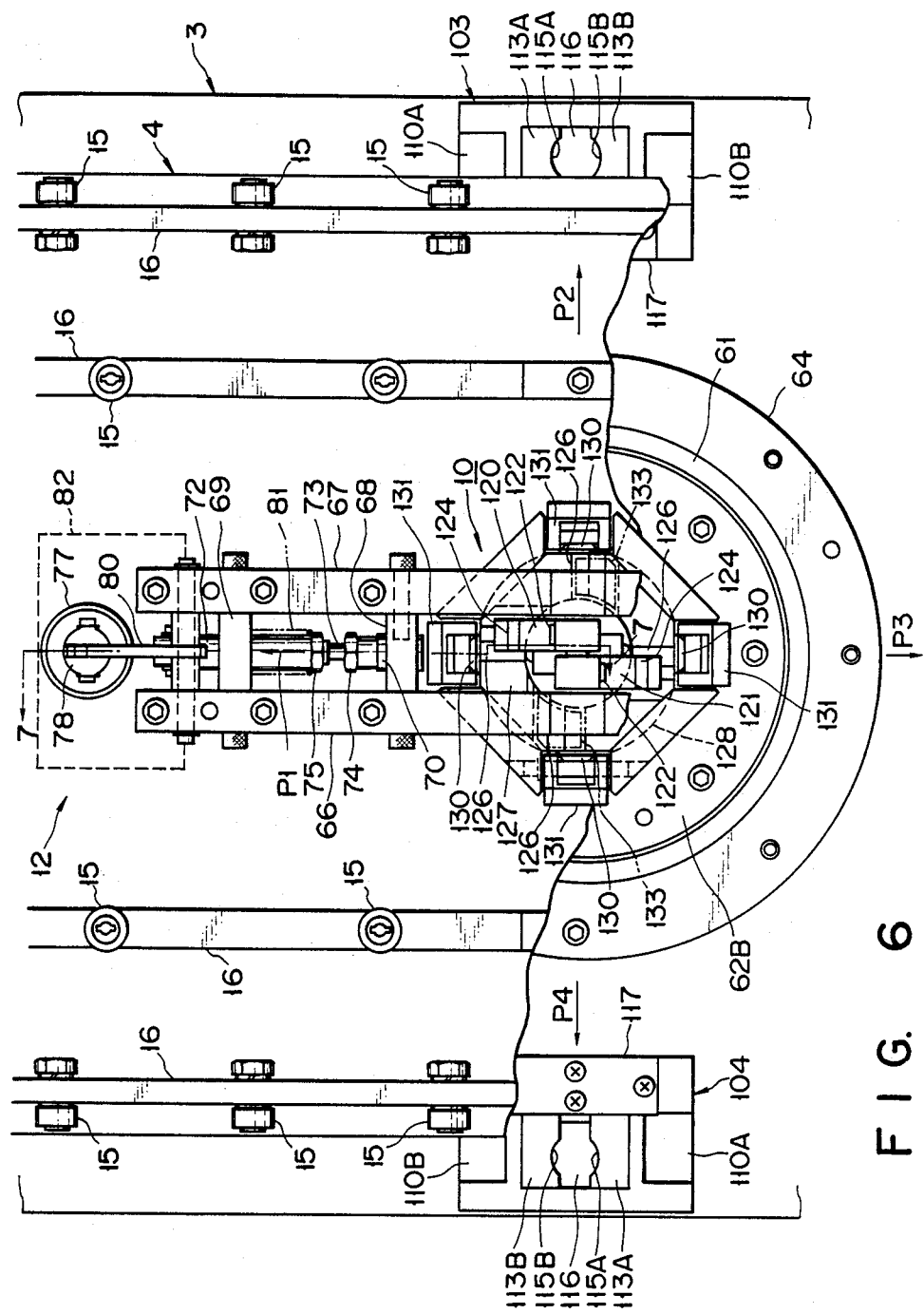
FIG. 6 is a plan view showing the left half of the arrangement about a pallet support shown in FIG. 1.
Figure 7:
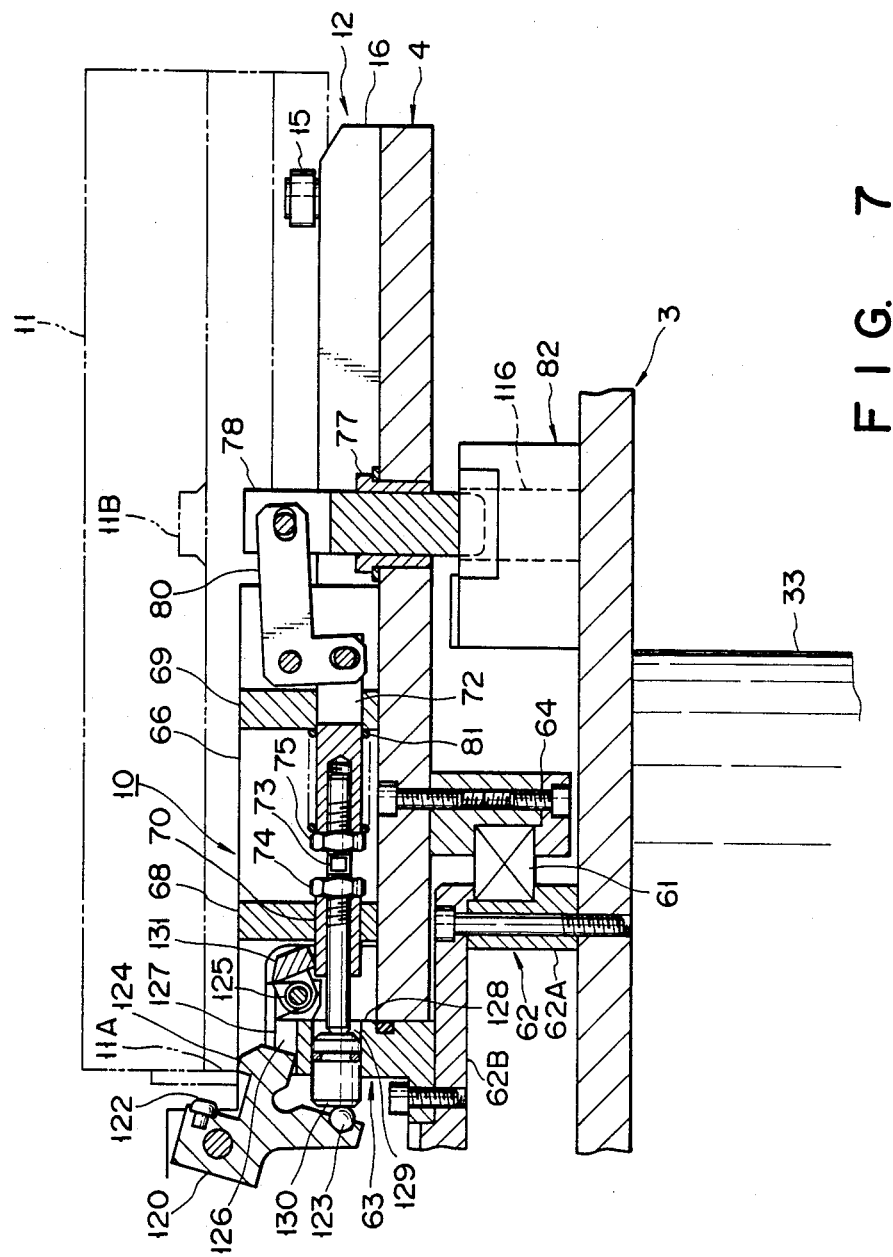
FIG. 7 is a perspective view taken along line 7—7 with arrows in FIG. 6.
Figure 8:
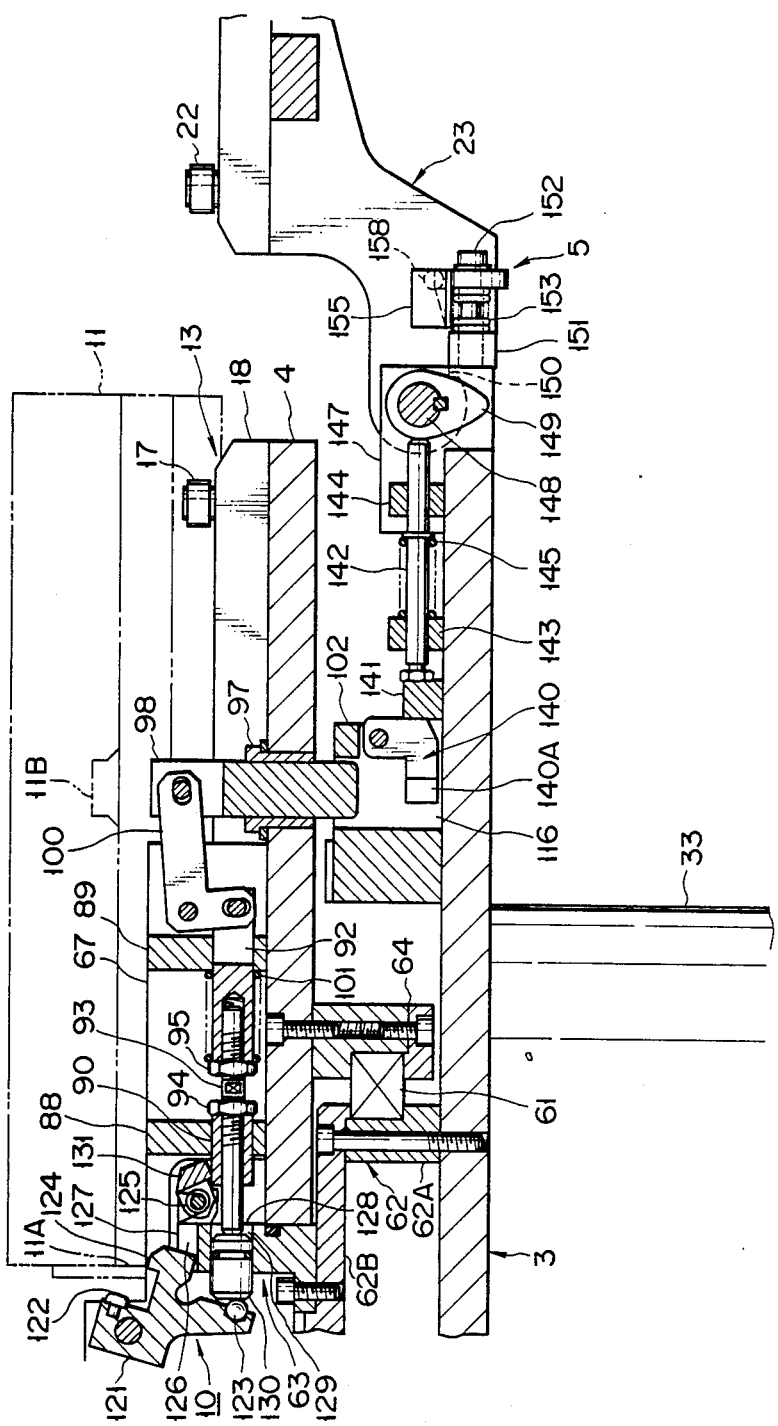
FIG. 8 is a cross-sectional view showing the right half of the arrangement about the pallet support in FIG. 1.

Referring to FIGS. 6 to 8, base block 62 is fixed to the central portion of bed 3. Base block 62 comprises stud ring 62A with bearing 61 mounted on its the outer periphery, and disk 62B. Center block 63 having a substantially annular form is fixed to the upper face of base block 62 concentrically with bearing 61. Pallet support 4 has center block 63 rotatably fitted thereon, and it can be rotatably supported by bearing 61 and bearing holder 64 mounted on the lower face of pallet support 4.

A pair of center plates 66 and 67 are fixed to the upper face of pallet support 4 such that they are symmetrical with respect to the center of rotation of pallet support 4 and in parallel with first rails 16. Supporting plates 68 and 69 bridge center plates 66 and 67 between the center of rotation and first inlet/outlet 12. As shown in FIGS. 6 and 7, pipe 70 passes through the central portion of supporting plate 68 which is nearer to center block 63 the supporting plate 69 such that it is movable in the longitudinal direction of first rails 16. Rod 72 slidably passes through supporting plate 69 and aligns with pipe 70. Rod 72 and pipe 70 are connected to each other by push rod 73 having at its intermediate portion outer threads engaged with inner threads formed in rod 72 and pipe 70. Lock nuts 74 and 75 engages the threads formed on the intermediate portion of push rod 73 to lock push rod 73 to rod 72 and pipe 70 such that the extents of engagement of push rod 73 with rod 72 and pipe 70 are adjustable and that an end portion of push rod 73 projects from the left end of pipe 70. L-shaped link 80 is coupled by a pin to center plates 66 and 67. Compression coil spring 81 is wound around rod 72 with its respective ends urged against supporting wall 69 and lock nut 75. Thus, push rod 73 is spring-biased toward center block 63 to always urge positioning pin 78 downward.

As shown in FIG. 8, supporting plates 88 and 89 are fixed to center plates 66 and 67 between the center of rotation of pallet support 4 and second inlet/outlet 13. Pipe 90 slidably passes through a central portion of supporting plate 88 such that it is movable in the longitudinal direction of second rails 18. Rod 92 slidably passes through the other supporting wall 89 and aligns with pipe 90. Rod 92 and pipe 90 are connected to each other by push rod 93. Lock nuts 94 and 95 engage outer threads formed on the intermediate portion of push rod 93 to lock push rod 93 to rod 92 and pipe 92 such that the extents of engagement of push rod 93 with rod 92 and pipe 90 is adjustable. An end portion of push rod 93 projects from the left end of pipe 90. Beyond the other end of push rod 93, positioning pin 98 as positioning member passes through bush 97 mounted in pallet support 4 such that pin 98 can move upward and downward across pallet support 4. The head of pin 98 and the right end of rod 92 are connected by pins to L-shaped link 100 coupled by a pin to center plates 66, 67. The distance from the center of rotation of pallet support 4 to positioning pin 98 is equal to the distance between the center of rotation of pallet support 4 to positioning pin 78. Compression coil spring 101 is wound around rod 92 with its respective ends urged against supporting plate 89 and lock nut 95, thereby always urging push rod 93 toward center block 63 so as to always push positioning pin 98 downwardly by link 100.

When first and second inlet/outlets 12 and 13 are facing respective bridges 21 and 23 so that pallet 11 can be transferred between bridges 21 or 23 and pallet support 4, first stop 82, into which positioning pin 78 or 98 can be inserted, is fixed to the portion of bed 3 which is right below positioning pin 78 (FIG. 7). At the same time, second stop 102 into which positioning pin 98 or 78 can be inserted is fixed to the portion of bed 3 which is right below positioning pin 98 (FIG. 8). By this arrangement, pallet support 4 is can be prevented from rotating and secured to bed 3. Further, a pair of stops 103 and 104 are fixed to those portions of bed 3 which are separated through 90° with respect to the center of rotation of pallet support 4, and are symmetrical with each other with respect to the center (FIG. 6). When pallet support 4 is rotated through 90° from the state shown in FIG. 8, positioning pins 78 and 89 can be inserted into the respective stops 103, 104. More specifically, stops 82, 103, 102 and 104 are arranged at an interval of 90° with respect to the center of center block 63 as indicated by arrows P1, P2, P3, and P3 (FIGS. 6).

Referring to FIG. 9, stops 82, 102, 103 and 104 have the substantially same structure, and each of them has stop holder 111 fixed to bed 3. Stop holder 111 has upwardly inclined surfaces 110A and 110B at the sides on which positioning pins 78, 98 are brought. When pallet support 4 is rotated and positioning pins 78 and 98 ride on surface 110A or 110B, pins 78 and 98 slides on the surface to be upwardly displaced against biasing force of compression coil springs 81 and 101. A pair of slide stops 113A and 113B are in the central opening of stop holder 111 as guide member. Stop 113A and 113B are upwardly biased by compression coil springs 112A and 112B whose biasing force are weaker than that of compression coil springs 81 and 101, and can be movable vertically with a gap interposed therebetween by slide guide 112. Stop plate 114 is fixed to the upper face of stop holder 111. It extends along the passage of positioning pins 78 and 98. It is in contact with the upper ends of upwardly biased slide stops 113A and 113B. In the central opening of stop holder 111 are formed opposed curved surfaces 115A and 115B having a radius of curvature substantially equal to that of positioning pins 78 and 98. Surfaces 115A and 115B define positioning hole 116, into which positioning pins 78 and 98 can be inserted.

When positioning pins 78 and 98 are lowered by compression springs 81 and 101 and brought into contact with upwardly inclined surface 110A, as pallet support 4 is rotated, pin 78 or 98 is gradually raised against compression coil springs 81 and 101. When the lower end face of positioning pin 78 or 98 reaches slide stop 113A, positioning pins 78 and 98 downwardly bias slide stop 113A and are lowered. When pallet support 4 is further rotated and the outer periphery of positioning pin 78 or 98 is brought into contact with the lateral wall of the other slide stop 113B, the lower end surface of positioning pin 78 or 98 leaves the upper end face of positioning pin 78 or 98, thus raising stop 113A by compression coil spring 112A. Positioning pin 78 or 98 is inserted and held in positioning hole 116 defined by curved surfaces 115A and 115B formed on stops 113A and 113B. Therefore, there is no need of further operation for positively stopping the rotation of pallet support 4 when positioning pin 78 or 98 aligns with positioning hole 116. Instead, by merely turning pallet support 4 until positioning pin 78 or 98 is brought into contact with the lateral wall of slide stop 113B, positioning pin 78 or 98 is automatically inserted and restricted in positioning hole 116 to set pallet support 4 in position on bed 3. Since stops 82 and 102, and 103 and 104 are symmetrically arranged with respect to the center of rotation of support 4, the same function can be obtained when turning pallet support 4 in the opposite direction.

Control mechanism 10 is provided around center block 63. On those central portions of center plates 66 and 67 which are inside of center block 63, hook levers 120 and 121 are pivotally mounted such that they can rock with respect to respective push rods 73 and 93. Frictional members like dish springs (not shown) are provided between hook levers 120 and 121 and opposed end surfaces of center plates 66 and 67, so that hook levers 120 and 121 will not be rotated from the present position unless a predetermined external force is exerted to them. Hook levers 120 and 121 are fixed by cushioning member 122 and ball 123, respectively. Cushioning member 122 can be brought into contact with the end surface of pallet 11. Ball 123 faces each of push rods 73 and 93. Each hook lever has also hook 124 which can be received in groove 11A formed in the lower face of pallet 11. Lower face of hook 124 is slidable over the upper face of center block 63 in the circumferential direction. The upper face of center block 63 has with inversely trapezoidal recesses 126 formed at an interval of 90°. When hook levers 120 and 121 are turned downwardly with the lower face of hook 124 received in recess 126 in a state in which four positioning pins 78 and 98 are inserted in four stops 82, 102, 103 and 104, respectively, hook levers clamp center block 63 and hook 124 is detached from groove 11A of pallet 11. Thus, pallet 11 is now ready to be transferred. The other portion of the upper surface of center block 63 forms plane guide surface 127 to hold hook lever at such a height level that hook 124 engages groove 11A of pallet 11.

The projecting ends of push rods 73 and 93 slide on outer periphery 128 of center block 63 facing push rods 73 and 93. Outer periphery 128 is formed with through holes 129 circumferentially spaced apart at an interval of 90°. Idle pin 130 is inserted in each hole 129 such that it can be projected out of and retracted into hole 129 such that its respective ends can be brought into contact with push rods 73 and 93 and ball 123, respectively. To a portion of the outer periphery of center block 63 located above idle pin 130 is pivoted stop lever 131 by the biasing force of torsion coil spring 125 until the lower end thereof takes a substantially horizontal position.

When stop lever 131 is brought to be substantially horizontal, its lower end is located above the axis of pipe 70 or 90. When positioning pin 78 or 90 is inserted in positioning hole 116, the lower end of stop lever 131 is in contact with the outer periphery of pipe 70 or 90 (FIG. 7). When positioning pin 78 or 98 is pulled out of positioning hole 116, however, the lower end of stop lever 131 is in contact with the outer periphery of push rod 73 or 93 (FIGS. 10, 11).

In FIG. 7, when first inlet/outlet 12 of pallet support 4 faces clamper 1A, stop lever 131 rests on the outer periphery of pipe 70, and does not restrict the displacement of push rod 73 integral with pipe 70. Thus, downward displacement of positioning pin 81 by compression coil spring 81 via push rod 72 and link 80 is not suppressed. Thus, positioning pin 78 is inserted into stop 82, whereby pallet support 4 is secured to bed 3. In this state, push rod 73 biased by compression coil spring 81 rotates hook lever 120 via corresponding idle pin 130 and ball 123 in a direction in which hook lever 120 is forcibly lowered, thus forcibly disengaging hook 124 from groove 11A of pallet 11, whereby pallet 11 can be transferred from pallet support 4. When a work to be machined is mounted on pallet 11, pallet is transferred to clamper 1A fixed to the upper face of work table 1 of machine tool, and is transferred again to pallet support 4 after the work has been machined.

Figure 10:
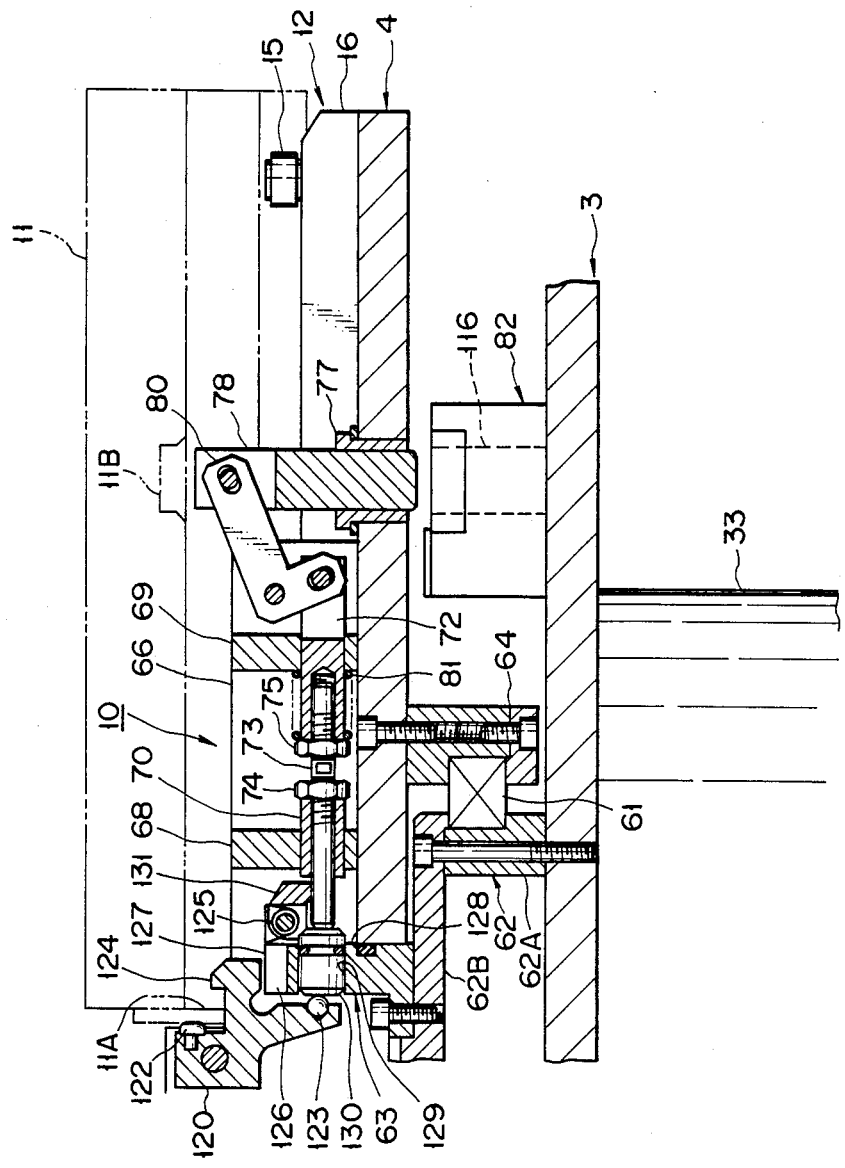
FIGS. 10, 11 and 12 are views similar to FIG. 7 and explain the operation of clamping/unclamping control mechanism.
Figure 11:
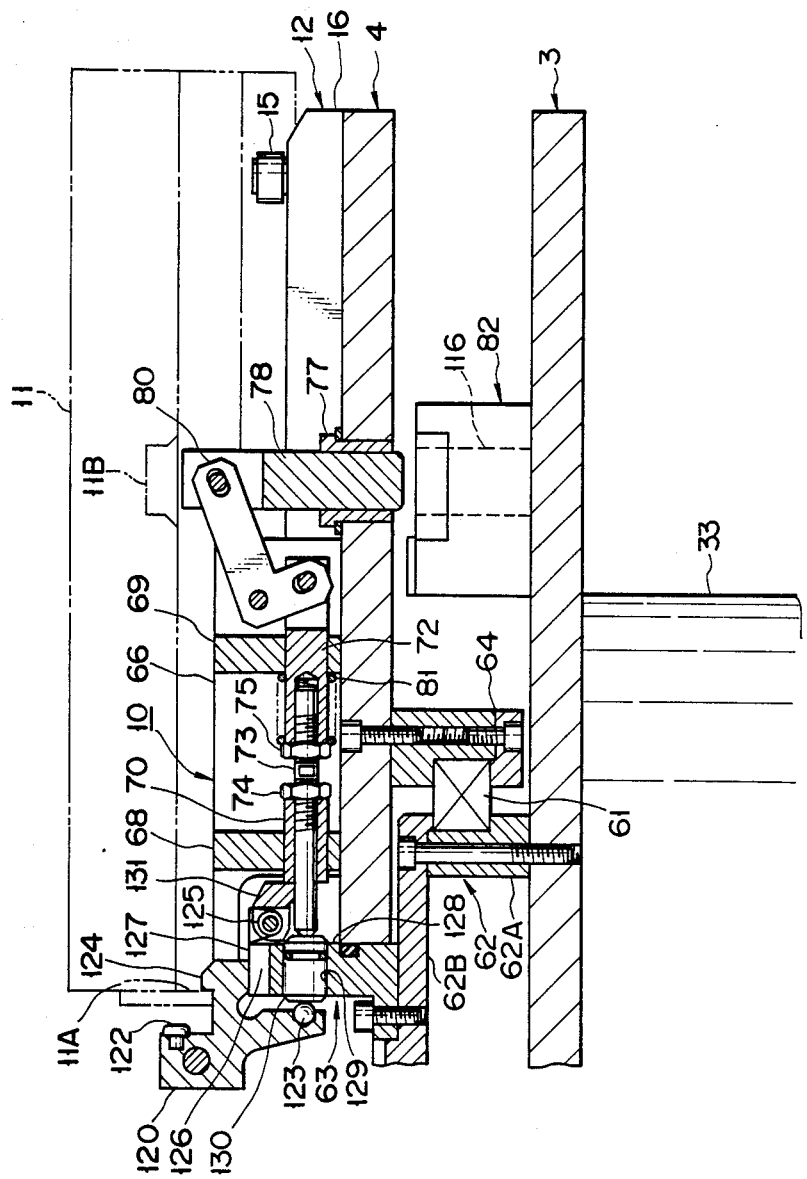

When transferring pallet 11 with a machined work is transferred to pallet support 4 through first inlet/outlet 12, and the end of pallet 11, which is being transferred to pallet support 4, abuts against cushioning member 122 of hook lever 120 as shown in FIG. 10, hook lever 120 is rotated in the counterclockwise direction by pallet 11. Push rod 73 is displaced by hook lever 120 in the rightward direction in FIG. 10 against compression coil spring 81 via ball 123 and idle pin 130. In the interlocked state, positioning pin 78 is upwardly displaced to be disengaged from stop 82. At the same time, stop lever 131 falls from the outer periphery of pipe 70 onto the outer periphery of push rod 73. Stop lever 131 abuts against the corresponding end of pipe 70, and thus positioning pin 78 remains disengaged from stop 82 (FIG. 11). At this time, hook lever 120, which has been rotated in the counterclockwise direction, maintains the present position by the frictional braking action of the disk spring (not shown), whereby hook 124 is received in groove 11A of pallet 11.

Figure 12:
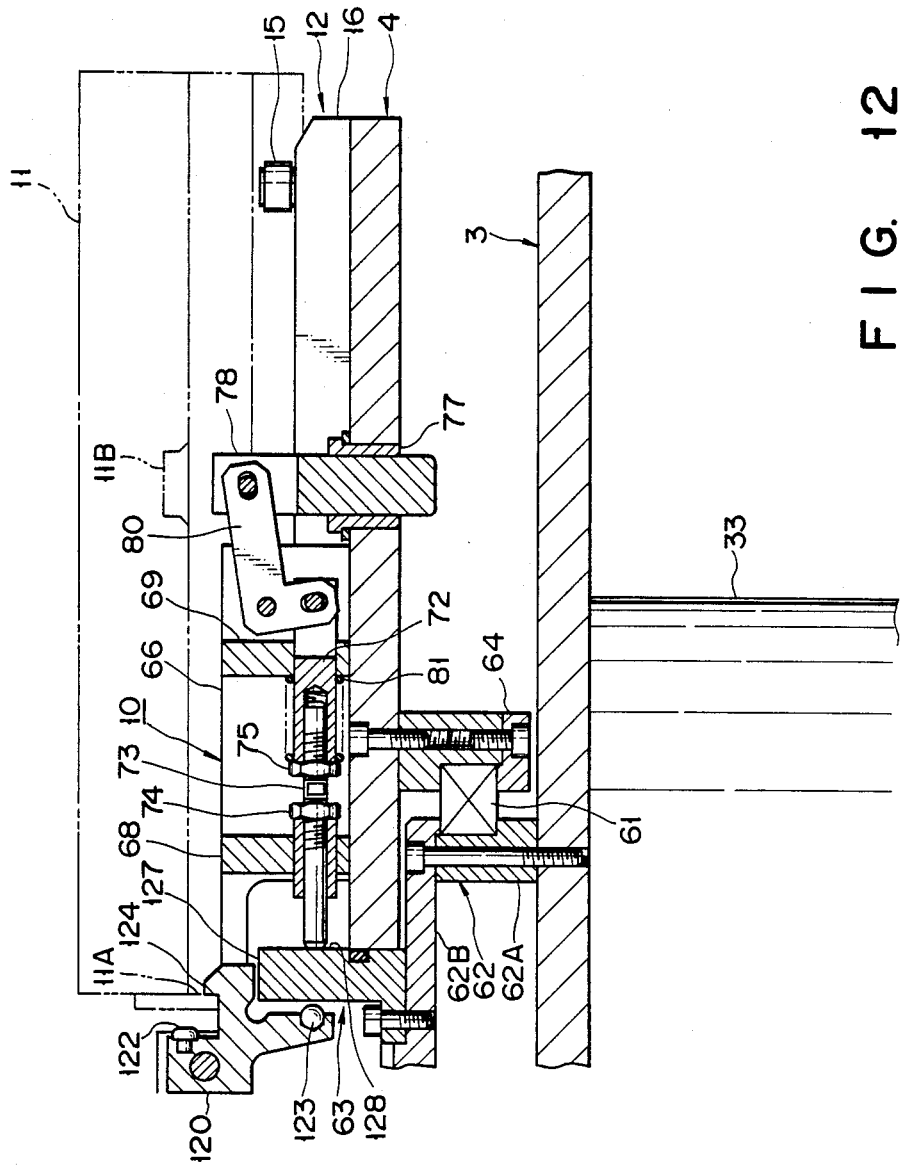

Likewise, when positioning pin 98 remains disengaged from stop 102, pallet support 4 can rotate about center block 63. When pallet support 4 is rotated from the state shown in FIG. 11, pipes 70 and 90 are moved in the crosswise direction of the end face of stop lever 131. When positioning pins 78 and 98 are displaced from a position right above stop 82, stop lever 131 is disengaged from the end surface of pipe 70 or 90. As a result, push rods 73 and 93 are displaced until their end is brought into contact with the peripheral surface 128 of center block 63 as shown in FIG. 12 by compression coil springs 81 and 101, and positioning pins 78 and 98 are lowered. When pallet support 4 is rotated through at least 90° from the state as shown in FIG. 7, the state as shown in FIG. 7 is automatically attained again.

As described above, when positioning pins 78 and 98 are engaged with stops 82 and 102 or 103 and 104, control mechanism 10 raises positioning pins 78 and 98 separately to disengage them from stops by transferring force produced by pallet 11 transferred from pallet inlet/outlet 12 or 13 to pallet support 4. Control mechanism 10 also automatically lowers both positioning pins 78 and 98 from the raised state as pallet support 4 is rotated. Thus, the positioning of pallet support 4 on bed 3 and releasing therefrom are performed mechanically and sequentially.

As shown in FIG. 12, the lower end of hook 124 of hook lever 120 is disengaged from recess 126 in the upper face of center block 63 and moved on guide surface 127 during rotation of pallet support 4. At this time, hook 124 is engaged with groove 11A of pallet 1, so that pallet 11 is prevented from being displaced outwardly or detached from pallet support 4 by the centrifugal force due to rotation of pallet support 4.

In response to the operation of turning pallet support 4, control mechanism 10 automatically and sequentially causes positioning pins 78 and 98 to be received in and detached from stops 82 and 102 (103 and 104) to position pallet support 4 on bed 3 in four positions which are separated through 90° from each other. When work table 1 and pallet stocker 2 face respective bridges 21 and 23 as shown in FIG. 1, stops 103 and 104 are substantially unnecessary. In this case, positioning hole 116 of each of stops 103 and 104 is closed by plug 117 (see FIG. 9). Plug 117 has a trapezoidal upper end which slightly projects from positioning hole 116, and width W of slide stops 113A and 113B is smaller than the diameter of positioning pins 78 and 98. Therefore, positioning pins 78 and 98 pass over plug 117 without lowering slide stops 113A and 113B. Consequently, stops 103 and 104 substantially do not operate any more. Stops 103 and 104 are substantially auxiliary stops and are required when pallet stocker 2 cannot face bridge 23 because there is no space in front of bridge 23. Stops 103 and 104 may be removed instead of closing each of them with plug 117 if they are not required. When inserting plug 117 into each of stops 103 and 104 or removing such stops, it is desirable to fill the corresponding recess 126 in center block 63 with plug 133. By doing so, hook 124 can pass over plug 133 while it is received in groove 11A of pallet 11. Thus, in passing over plug 133, pallet 11 is prevented from being displaced outwardly or dropped from pallet support 4 due to centrifugal force produced by rotation of pallet 4.

The pallet changer of this embodiment is basically for changing pallets between clamper 1A secured to work table 1 of a machine tool and pallet stocker 2. With this pallet changer, however, it is possible to replace the machined work with a new work to be machined on pallet 11 on pallet support 4. In this case, pallet 11 is not transferred from pallet support 4.

Figure 13:
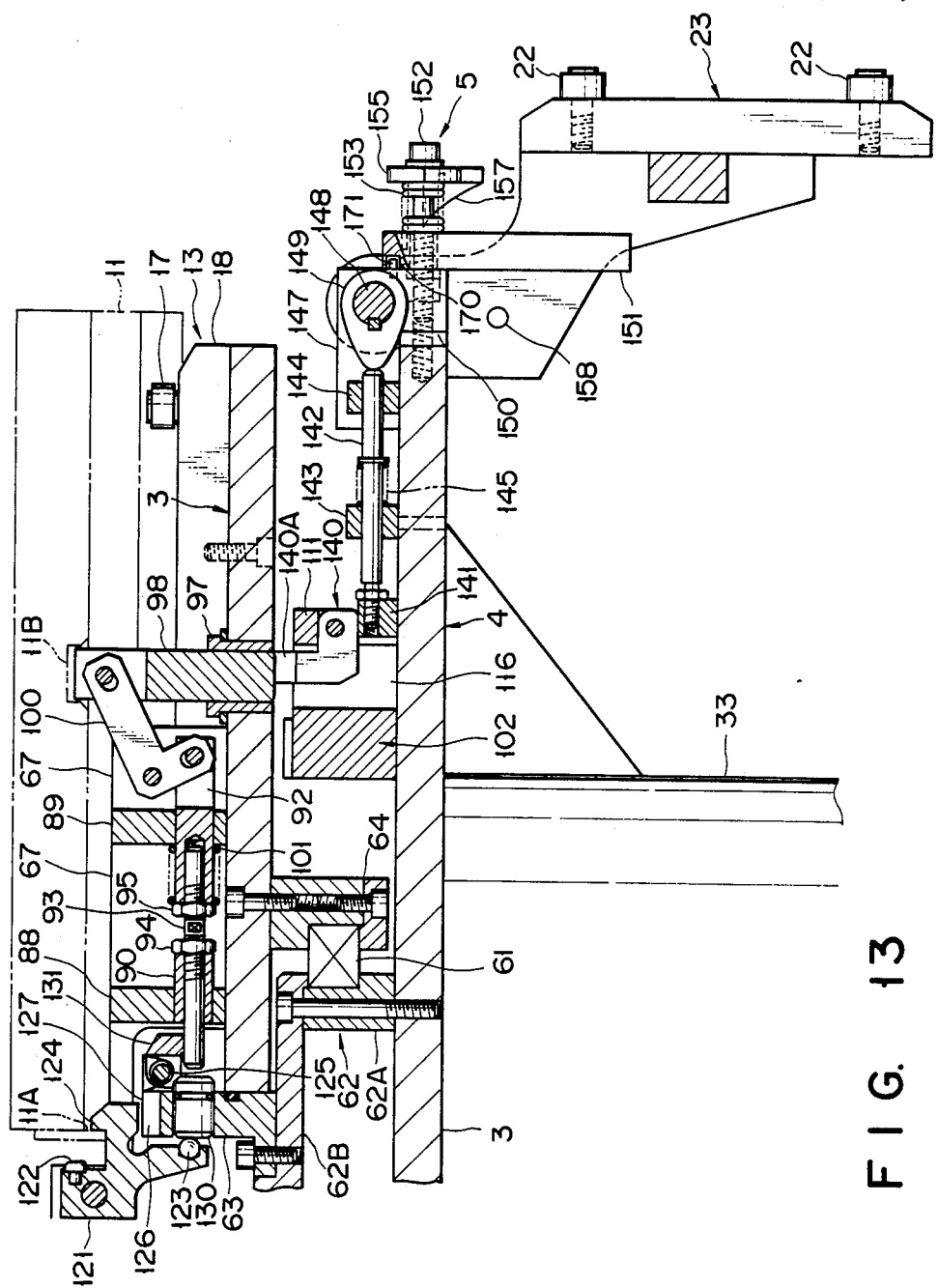
FIG. 13 is a sectional view showing the arrangement of a cam mechanism which set bridges to be horizontally or vertically by a single operation.
Figure 14:
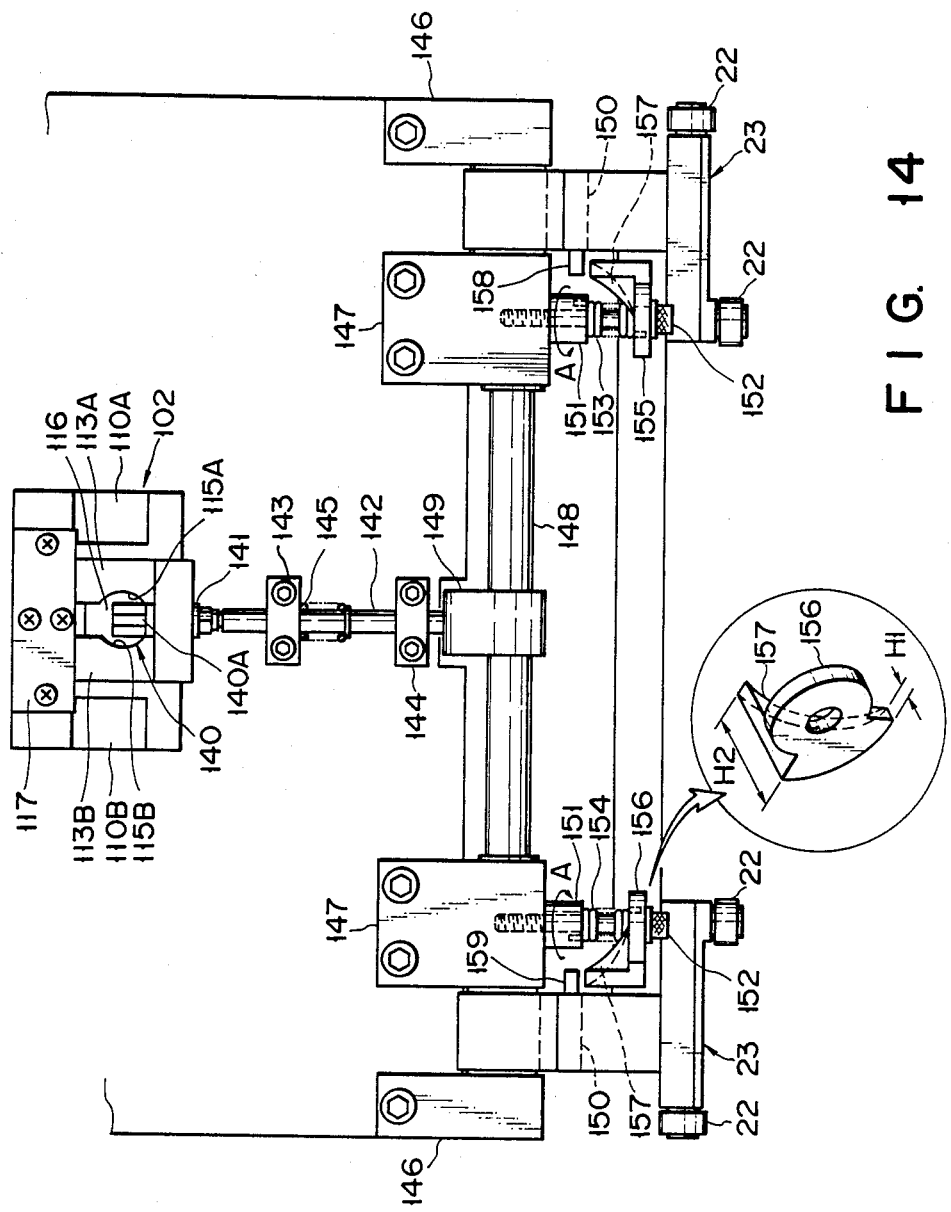
FIG. 14 is a plan view showing the arrangement of FIG. 13.

Now, disengagement unit 5 will be described. As shown in FIGS. 8, 13 and 14, L-shaped swing lever 140 as a function selection member is pivoted to stop holder 111 of stop 102 such that trapezoidal end 140A of L-shaped swing lever 140 can be projected from positioning hole 116. Push rod 142 slidably passes through a pair of guide pieces 143, 144 fixed onto bed 3. Push rod 142 has pusher 141 at one end thereof which rotates swing lever 140. As shown in FIGS. 13 and 14, shaft 148 is disposed in front of the other end of push rod 142. It extends along the edge of bed 3 and is carried by brackets 146 and 147 on bed 3 (FIG. 14). Face cam 149 is fixed to the central portion of shaft 148 and is in contact with the end of push rod 142 on the side of shaft 148 and slides push rod 142 in its longitudinal direction as cam 149 rotates. Compression coil spring 145 is provided between guide 143 and a flange formed on push rod 142 and always urges push rod 142 toward cam 149 so as to always contact rod 142 with face cam 149.

A pair of bridges 23 are rotated in the opposite directions by shaft 148. When bridges 23 are brought to a horizontal state as shown in FIG. 8, push rod 142 is retracted and in contact with the minimum rise point of face cam 149. Swing lever 140 is rotated counterclockwise from the state of FIG. 13 to the state of FIG. 8 to lower trapezoidal end 140A to the bottom of positioning hole 116. In consequence, positioning pins 78 and 98 are engaged with stop 102 When bridges 23 are brought substantially to a vertical state, as shown in FIG. 13, push rod 142 is in contact with the maximum rise point of face cam 149 to cause trapezoidal end 140A of swing lever 140 to be projected upwardly from positioning hole 116. Thus, just like plug 117, disengaging unit 5 suppresses the substantial function of stop 102, and also raises positioning pins 78 and 98 to an extra extent.

When the work is replaced with a new one on a pallet without removing the pallet from pallet support 4, stop 102 is not used. At this time, stop 82 opposed to stop 102 works. Therefore, even if one pair of positioning pins 98 and 78 are not received in stops 102, the other pair of positioning pins 98 and 78 are inserted into stop 82. Accordingly, control mechanism 10 enables pallet support 4 to rotate when pallet 11 is transferred from clamper 1A to pallet support 4.

As described above, control mechanism 10 allows the positioning to remain disengaged from the stop when a pallet is transferred from pallet inlet/outlet 12 or 13 to pallet support 4. Therefore, the use of the simple structure in which swing lever 140 is selectively projected from positioning hole 116 of stop 102 or lowered therein enables the pallet changer to perform two different operations without modifying control mechanism 10, one operation being that the machined work is replaced with a new work on pallet support 4 without transferring the pallet, and the other operation being that the pallet is transferred between pallet support 4 and pallet stocker 2.

When positioning pin 78 or 98 is raised to an extra extent by swing lever 140 projecting from positioning hole 116 of stop 102, the upper end of positioning pin 78 or 98 is received in downwardly opened positioning hole 11B formed in pallet 11, thereby fixing pallet 11 to pallet support 4. Thus, it is possible to stabilize the operation of replacing the machined work with a work to be a new one on pallet 11.

Pair bridges 23 can be brought to the horizontal and vertical states with rotary position disengaging unit 5 by a single operation.

Each bridge 23 is formed with engagement groove 150, which faces the corresponding edge of bed 3 when the bridge is in the vertical state as shown in FIG. 13 and be directed downwards when the bridge is in the horizontal state as shown in FIG. 8. Stop lever 151 is rotatably connected to the respective bracket 147 such that it is received in engagement groove 150 when bridge 23 is in the horizontal state. Stop lever 151 is formed with annular groove 170 subtending the axis of screw 152 and extending through 90°. Pin 171 received in groove 170 is fixed to bracket 147. Stop lever 151 is rotated in a range between the horizontal and vertical positions. Torsion coil spring 153 or 154 is wound around screw 152 with one end thereof secured to stop lever 151. End cam 155 or 156 as driven member receives the other end of torsion coil spring 153 or 154 and is fixed to screw 152. End cam 155 or 156 is elastically connected to stop lever 151 and can be rotated in unison. End cams 155 and 156 are arranged therewith in a mirror-image relationship, and each of them has inclined cam surface 157, which extends through substantially 90° as shown in FIG. 14. The cam rises at its ends are H1 and H2, respectively.

End cam 155 or 156 is so arranged that it takes an initial position in which the portion of smaller cam rise H1 is located in the lowermost position when stop lever 151 and bridge 23 take the substantially vertical position. Pins 158 and 159 are fixed to the lateral wall of bridges 23. When bridge 23 is rotated from the vertical state to the horizontal state, pin 158 or 159 contacts cam surface 157 of end cam 155 or 156 and rotates end cam 155 or 156 in the direction of arrow A in FIG. 14. When each bridge 23 is set to the horizontal position, end cam 155 or 156 is turned until the portion of cam rise H1 is engaged with pin 158 or 159, as shown in FIG. 8. At this time, pin 158 or 159 is located above the axis of screw 152. The maximum rotational angle of end cam 155 or 156 from the initial state is more than 90°. Stop lever 151, which is rotated in unison with end cam 155 or 156, is rotated through 90° to be received in engagement groove 150.

Thus, by merely turning bridges 23 to the horizontal position, stops 151 are received in engagement grooves 150, and bridges 23 can be held in the horizontal position. In this case, even if the rotational angle of end cams 155 and 156 exceeds 90°, no excessive forces will be exerted to end cams 155 and 156, because end cams 155 and 156 can be rotated relative to stop levers 151 due to the elasticity of torsion coil springs 153 and 154.

When stop levers 151 are received in engagement with grooves 150, the portion of cam rise H1 is in engagement with pins 158 and 159. Thus, when bridges 23 are rotated upwardly from the horizontal state, pins 158 and 159 are disengaged from end cams 155 and 156. In consequence, end cams 155 and 156 are rotated by the biasing forces of the torsion coil springs 153 and 154 until the end face of the portion of larger cam rise H2 is directed substantially upwardly. The upward movement of bridges from the horizontal state increases the gap between stop lever 151 and engagement groove 150, so that stop lever 151 is rotated downwardly by its own weight. Thus, stop levers 151 and end cams 155 and 156 are naturally returned to the initial state shown in FIG. 13. If stop levers 151 are not smoothly rotated downwardly at this time, bridges 23 are slightly rotated upward further and pins 158 and 159 are released from end cams 155 and 156, and then bridges 23 are rotated downward. Thus, pins 158 and 159 are brought into contact with the end face having cam rise H1 which is directed substantially upwardly at this time, and end cams 155 and 156 are forcibly rotated. As a result, stop levers 151 integrally coupled to end cams 155 and 156 are returned together with the same to the initial state.

It is to be understood that by slightly raising bridges 23 from the horizontal state and then turning them substantially to the horizontal state, it is possible to disengage stop levers 151 from engagement grooves 150 and return bridges 23 to the vertical state by a single operation.

Figure 15:
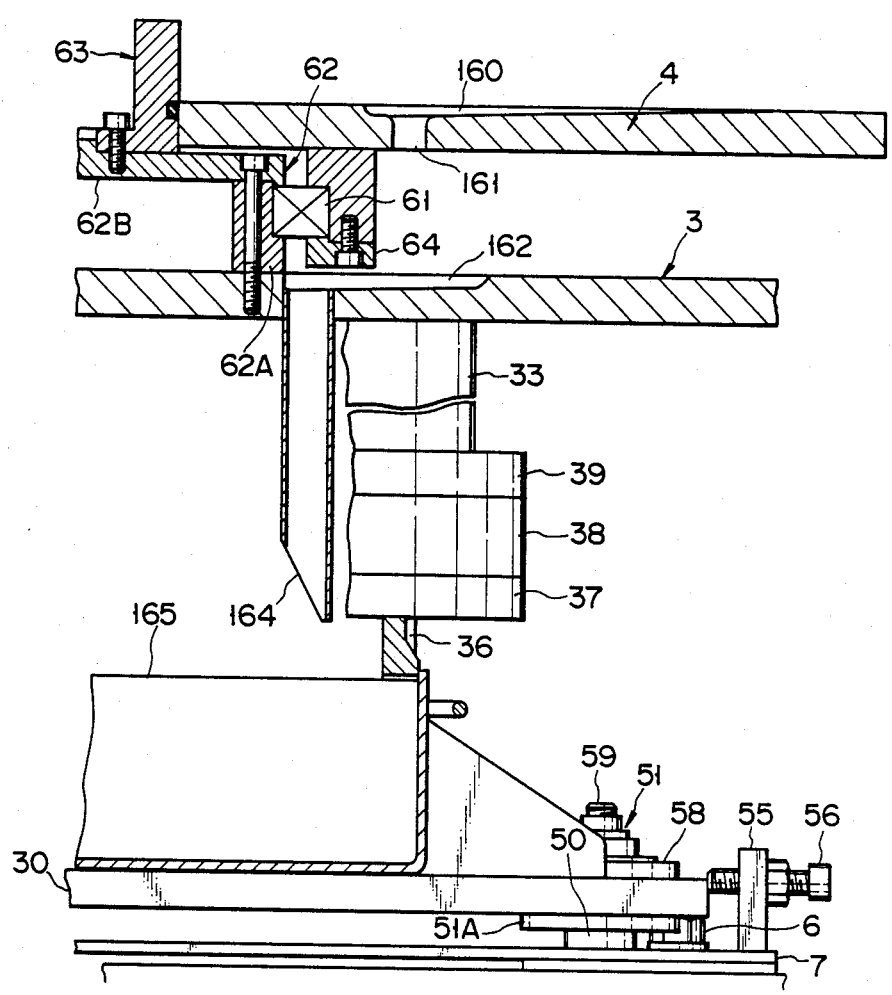
FIG. 15 is a sectional view showing a structure for recovering cutting oil in the pallet changer.

Referring to FIG. 15, a mechanism for recovering the cutting oil in the pallet changer will be described.

When pallet 11 with a machined work is transferred to pallet support 4, cutting oil on pallet 11 and work drops onto pallet support 4. To recover this cutting oil, the surface of pallet support 4 is formed with a plurality of radially extending oil ducts 160 which are slightly inclined downward toward center block 63. Oil ducts 160 may be replaced with the surface of pallet support 4 which is slightly inclined downward toward center coil duct hole 161. From the inner end of each oil duct 160 or the inner edge of the inclined surface of pallet support 4 extends oil conducting hole 161 which passes through the thickness of pallet support 4. The portion of the surface of bed 3 outside of base block 62 is formed with a circumferential groove 162, which is slightly inclined downward toward base block 62 to receive cutting oil which drops from oil duct hole 161. Oil duct 164 is fixed to bed 3 to lead cutting oil from circumferential groove 162 to oil reservoir 165 which is detachably mounted in lower body 32 so that cutting oil from oil duct 164 through oil duct 164 is recovered in oil reservoir 165. In front of oil reservoir 165 is provided an indicator (not shown), which indicates the amount of recovered cutting oil. Thus, recovered cutting oil will not overflow from reservoir 165 on the floor. It is thus possible to perfectly prevent the possibility that an operator slips and tumbles on overflowed oil during the operations of turning pallet support 4 and changing pallets 11.

Now, the operation of changing pallets with the pallet changer according to the invention will be described.

Figure 16:
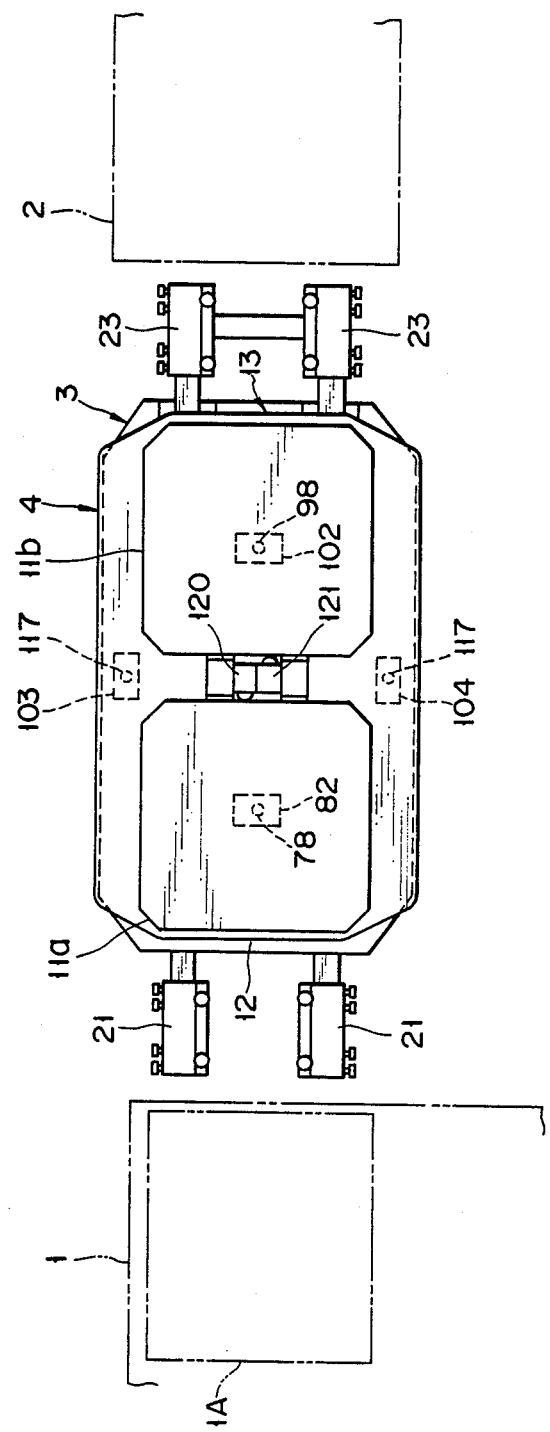
FIG. 16 is a plan view of the pallet exchanger, in which the pallets are exchanged with them disposed opposed to the corresponding bridges by turning the pallet support through 180°.

In FIG. 16, clamper 1A fixed to work table 1 and pallet stocker 2 face respective bridges 21 and 23. At this time, stops 103 and 104 are unnecessary. Therefore, the function of stops 103 and 104 is substantially inhibited by inserting plug 117 in positioning hole 116 of these stops. Alternatively, both stops 103 and 104 may be removed from bed 3. Further, bridges 23 are set to be horizontal as shown in FIG. 8, trapezoidal ends of swing levers 140 are lowered in positioning holes 116 of stops 102, and positioning pins 78 and 98 are inserted in stops 102.

For example, as shown in FIG. 16, first and second inlet/outlets 12 and 13 are arranged to face clamper 1A and pallet stocker 2, respectively. Positioning pins 78 and 98 are received in stops 82 and 102, respectively, and control mechanism 10 is set in the state shown in FIGS. 7 and 8 to position pallet support 4 on bed 3. At this time, pallet 11a with a work to be machined is located on first rails 16. Then, pallet 11a is transferred to clamper 1A for machining the work by the machine tool. Then, pallet 11b with a work to be machined is transferred from pallet stocker 2 to second rails 18 to be ready for transfer to clamper 1A. At this time, an end of pallet 11b transferred to pallet support 4 strikes cushioning member 122 to rotate hook lever 120. Thus, positioning pin 98 is raised and disengaged from stop 102. This state is maintained by stop lever 131. At this time, positioning pin 78 has not yet been disengaged from stop 82, so that pallet support 4 is not permitted to be rotated. When pallet 11a with the machined work is transferred onto first rails 16, the end of transferred pallet 11a strikes cushioning member 122 to rotate hook lever 120. Thus, as shown in FIG. 11, positioning pin 78 is raised and disengaged from stop 82, and this state is maintained by stop lever 131. The rotation of pallet support 4 is permitted when pallet 11a with the work to be machined and pallet 11b with the machined work have both been transferred to pallet support 4.

When pallet support 4 is rotated through 180°, positioning pins 78 and 98 are automatically received in stops 102 and 82, whereby pallet support 4 is fixed to bed 3. In this state, pallet 11b with the work to be machined is transferred to clamper 1A, and pallet 11a with the machined work is transferred to pallet stocker 2. In this way, the changing of pallets for the next machining cycle is prepared, and the same sequence of operations is repeated if desired.

When pallets are transferred between clamper 1A and pallet stocker 2 after rotating pallet support 4, the fixing and releasing of pallet support 4 as described above are sequentially performed by control mechanism 10. When pallet support 4 is rotated and first and second inlet/outlets 12 and 13 face work table 1 and pallet stocker 2, positioning pins 78 and 98 are automatically received in stops 82 and 102 when pallet support 4 reaches a position. Pallet support 4 is fixed to bed 3. Thereafter, the pallet transfer operations necessary for the changing of pallets are performed according to the predetermined sequence. That is, the pallet with the machined work is transferred to pallet stocker 2, the pallet with the work to be machined is moved from pallet stocker 2 to pallet changer, the pallet with the work to be machined is transferred to clamper 1A and then the pallet with the machined work is transferred from clamper 1A to pallet changer. After this series of operations, pallet support 4 is rotated for the next pallet change. The pallet changer thus is required only to perform the turning of pallet support 4 and the transferring of pallets sequentially by mechanical steps according to the predetermined order. Further, the operation of positioning and releasing of pallet support 4 with respect to bed 3 requires no other specific operation than the turning of pallet support 4 and the transferring of pallets.

Figure 17:
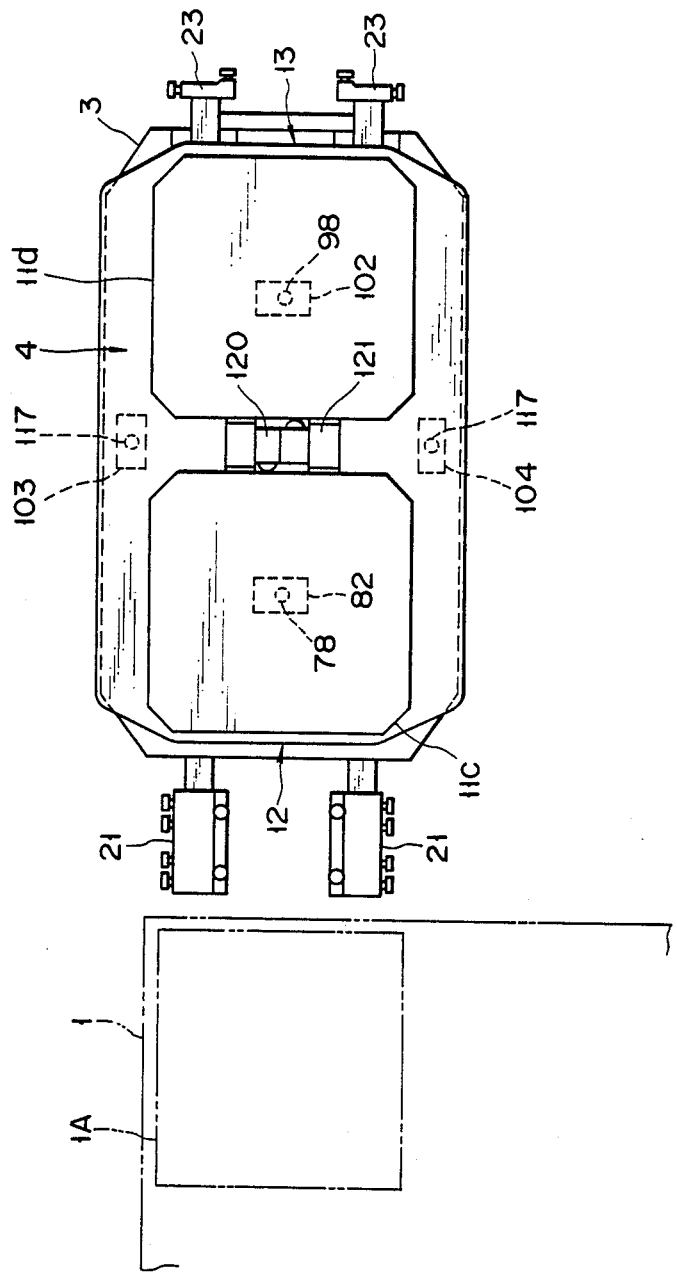
FIG. 17 is a plan view of the pallet exchanger, explaining for how to exchange the pallets without use of any pallet stocker.

Referring to FIG. 17, there is explained how to change works on pallet support 4 without transferring the pallet, on which a machined work is mounted and without use of pallet stocker 2. Again in this case, stops 103 and 104 are unnecessary and plugs 117 are inserted in positioning holes 116 of them. Further, bridges 23 are set in the vertical state as shown in FIG. 13, and swing levers 140 are projected from positioning holes 116 of stops 102 so as to prevent function of positioning pins 78 and 98 from being received in stops 102.

First inlet/outlet 12 faces clamper 1A as shown in FIG. 17. Positioning pin 78 is received in stop 82, and control mechanism 10 takes the state of FIG. 7. Thus, pallet support 4 is positioned on bed 3. The other positioning pin 98, as shown in FIG. 13, rests on trapezoidal end 140A of swing lever 140 projecting from positioning hole 116 of stop 102. At this time, first rails 16 carry pallet 11c, on which a work to be machined is mounted. At the same time, second rails 18 support pallet 11d, on which machined work is mounted. Then, pallet 11c is transferred to clamper 1A secured to work table 1 for machining the work by the machine tool. During the machining, the machined work on pallet 11d is replaced with a new work to be machined while pallet 11d is being supported on second rails 18. At this time, raised swing lever 140 causes the head of positioning pin 98 at the raised position to be inserted into positioning hole 11B of pallet 11d, whereby pallet 11d is immovable with respect to pallet support 4. Thus, the operation of changing works can be performed stably.

Subsequently, pallet 11c, on which the work having been machined during the work change is mounted, is transferred to first rails 16. The end of transferred pallet 11c strikes cushioning member 122 to rotate hook lever 120. Thus, positioning pin 78 is raised and disengaged from stop 82, as shown in FIG. 10, and this state is maintained by stop lever 131. After the change of the work on pallet 11d has been completed, pallet 11c with the machined work is transferred to pallet support 4. At this time, other positioning pin 98 remains disengaged from positioning hole 116 of stop 102, so that rotation of pallet support 4 is permitted.

When pallet support 4 is turned through 180°, positioning pin 98 is automatically received in stop 82 and pallet support 4 is positioned on bed 3. In this state, pallet 11d with a work to be machined is transferred to clamper 1A. Then, the change of pallets for the next machining cycle is prepared, and the same sequence of operations is repeated if desired.

The pallet changer according to the invention permits the change of work on pallet support 4 by projecting the trapezoidal end of swing lever 140 from positioning hole 116 of stop 102. In this case, the operations of pallet support 4 are performed sequentially by mechanical control mechanism 10 without any specific structure change. In this case, however, after the work change on pallet support 4 has been completed, the pallet with the machined work has to be transferred from the work table of the machine tool to pallet support 4. This is so because if the pallet with the machined work is transferred first, the rotation of pallet support 4 is permitted in an interlocked relation to this operation. Therefore, the work change on pallet support 4 can no longer be performed stably.

Figure 18:
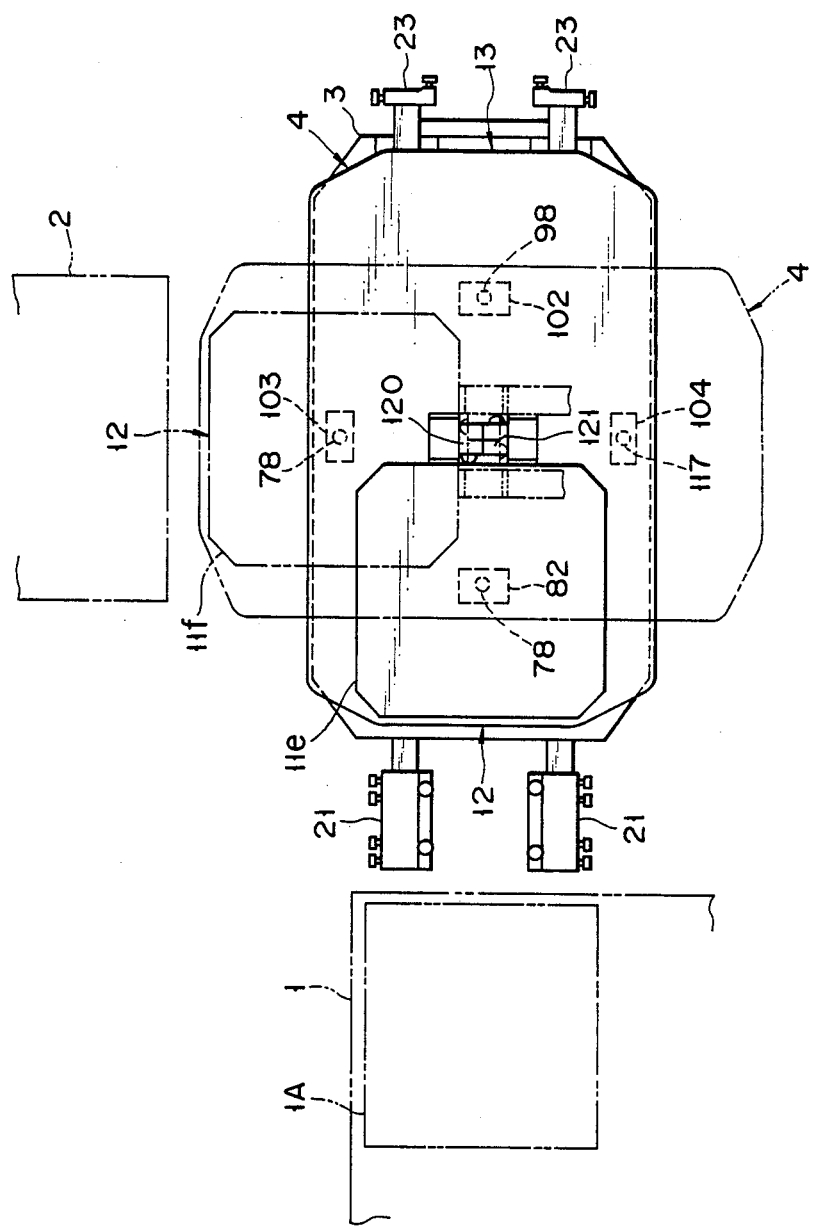
FIG. 18 is a plan view of the pallet exchanger, in which the pallets are exchanged by turning the pallet support through 90° back and forth.

FIG. 18 is a view for explaining function when pallet stocker 2 faces stop 103. In this case, stops 102 and 104 are unnecessary. Therefore, plug 117 is inserted in positioning hole 116 of stop 104, while bridges 23 are held in the vertical state as shown in FIG. 13, so that stops 102 and 104 do not work. It is also possible at this time to remove stop 104 from bed 3 in lieu of using plug 117.

When first inlet/outlet 12 faces clamper 1A secured to work table 1 of a machine tool, as shown by solid lines in FIG. 18, positioning pin 78 is received in stop 82. In the state of FIG. 7, pallet support 4 is secured to bed 3. At this time, first rails 16 support pallet 11e, on which a work to be machined is mounted. Pallet 11e is first transferred to clamper 1A for machining the work by the machine tool. When pallet 11e with a machined work mounted thereon is then transferred to pair rails 16, the end of transferred pallet 11e strikes cushioning member 122 to rotate hook lever 120. As a result, positioning pin 78 is raised and disengaged from stop 82, as shown in FIG. 11. This state is maintained by stop lever 131, and the rotation of pallet support 4 is permitted.

When pallet support 4 is rotated through 90°, positioning pin 78 is automatically received in stop 103 to allow first inlet/outlet 12 of pallet support 4 to face pallet stocker 2 as shown by dashed lines. Pallet 11e with the machined work thereon is transferred to pallet stocker 2, and then different pallet 11f with a work to be machined is transferred from pallet stocker 2 to pallet support 4. At this time, the end of new pallet 11f transferred to pallet support 4 strikes cushioning member 122 to rotate hook lever 120. For this reason, positioning pin 98 is again held disengaged from stop 103, and the rotation of pallet support 4 is permitted. When pallet support 4 is turned through 90° in the opposite direction, positioning pin 78 is automatically received in stop 82 again to start the next machining cycle. The same sequence of operations is repeated if desired.

This embodiment of pallet changer has an advantage that it permits pallet change between clamper 1A and pallet stocker 2 in case when pallet stocker 2 must be placed so as to face stop 103 or 104 because of the space restriction. Again in this case, the operations of pallet support 4 can be performed sequentially by the mechanical control mechanism 10.

When stops 102 to 104, pusher 141, push rod 142, face cam 149 and bridges 23 are removed, the resultant pallet changer performs a sole function of permitting work change on pallet support 4 without the pallet with the machined work transferred to external pallet stocker 2 from pallet support 4. In this case, control mechanism 10 can be used as such.

The pallet changer having the above structure operates basically in the same manner as the pallet changer having swing lever 140 which is projected from positioning hole 116 of stop 102. Control mechanism 10 has a structure for causing positioning pin to be disengaged from stop and be held in the disengaged state when pallet 11 is transferred from pallet inlet/outlet 12 or 13. Therefore, in the absence of stop 102, pallet support 4 is rotated only when positioning pin 78 or 98 disengages from stop 82. When pallet inlet/outlets 12 and 13 alternately face clamper 1A of machine tool 1, the work change is performed on the inlet/outlet which is not facing clamper 1A without removal of pallet from pallet support 4. When a pallet with a machined work is transferred from the inlet/outlet aligned with the machine tool after the work change operation, the positioning pin is disengaged from stop 82, thus permitting rotation of pallet support 4. Therefore, the operations of pallet support 4 are performed sequentially by control mechanism 10.

The present invention is not limited to the embodiment described above, but various changes and modifications are possible without departing from the scope and spirit of the invention.

For example, while in the above embodiment the pallet support carries at most two pallets, but it is possible to provide a pallet changer, in which a pallet support is so constructed that it has three or more pallet inlet/outlets disposed at its edges at regular intervals and that required number of positioning members and stops as well as the control mechanism therefor are provided. With this pallet changer, the pallets are successively transferred between the pallet support and a plurality of machine tools, whereby various machining operations can be performed in a short time.

In the above embodiment, positioning members are provided on the pallet support and stops are provided on the bed. However, it is possible to provide these parts conversely. In this case, the positioning mechanism and control mechanism may be provided on the pallet support and bed, respectively. Further, where the pallet support is rotated only in one direction by using a one-way clutch or the like, it is sufficient to provide only a single slide stop, which can be raised and lowered by an elastic force.

Further, the hook lever may be replaced with a plug member which can be detachably received in the recess.

Moreover, the above embodiment has been explained as a pallet changer for transferring pallets between a pallet support and a clamper secured to the work table of a machine tool, but the invention is applicable to a pallet changer in which pallets are directly transferred between the pallet support and the work table of a machine tool. With the above embodiment pallets are manually transferred, but the invention is also applicable to a pallet changer in which pallets are transferred by a motor or the like.

Further, it is possible to secure the driven engagement member to stop lever. The driven engagement member is not limited to the end cams as in the above embodiment. For instance, it is possible to replace the cam surface in the above embodiment with an engagement projection, e.g., a pin. The engagement projection engages a projection provided on an arm and follows the rotation of the arm to rotate a stop lever into a receiving space. After the stop lever has been received in the receiving space, the engagement projection is disengaged from the projection to a predetermined extent by a further rotation of the arm in the same direction. Further, such an engagement projection may be formed on the stop lever.

What is claimed is:

1. A pallet changer comprising:
   a bed;
   a pallet support rotatably provided on said bed and having edges and a plurality of pallet inlet/outlets provided at regular intervals on said edges;
   a pallet movable over said pallet support and transferrable to and from said pallet support at said pallet inlet/outlets;
   a plurality of positioning means provided on either one of said bed and pallet support at a same interval as said regular intervals of said pallet inlet/outlets;
   stopping means provided on the other one of said bed and said pallet support and engageable with said positioning means after said pallet support has been rotated through an angle corresponding to said regular intervals, all said positioning means except for at least one positioning means being engaged with the corresponding stopping means; and
   control means for disengaging said positioning means from said stopping means when said pallet is transferred to said pallet support through any one of said pallet inlet/outlets and for keeping said positioning means disengaged from said stopping means while said pallet support is rotated through said angle.

2. The pallet changer according to claim 1, wherein said at least one positioning means is selectively engaged by other stopping means.

3. The pallet changer according to claim 2, wherein at least one positioning means is a positioning pin, and said other stopping means comprises a stop having a positioning hole for receiving said positioning pin and a selecting member which selectively takes a first position, at which said selecting member is projected from said positioning hole, and a second position, at which said selecting member is retracted in said positioning hole.

4. The pallet changer according to claim 3, wherein said bed has a bridge facing one of said pallet inlet/outlets and pivotable between a vertical position and a horizontal position, at which said bridge is at the same height level as said one of said pallet inlet/outlet; and another control means for bringing said selecting member to said first position when said bridge is in said horizontal position and for bringing said selecting member to said second position when said bridge is in said vertical position.

5. The pallet changer according to claim 4, wherein said bridge has a transverse engagement groove, and said bed has a stop level received in said engagement groove when said bridge is in said horizontal position.

6. A pallet changer comprising:
   a bed;
   a pallet support provided on said bed and having edges and a plurality of pallet inlet/outlets provided at regular intervals on said edges;
   a pallet movable over said pallet support and transferrable to and from said pallet support at said pallet inlet/outlets;
   a plurality of positioning pins provided on either one of said bed and pallet support at a same interval as said regular intervals of said pallet inlet/outlets;
   a stop provided on the other one of said bed and said pallet support and having a positioning hole for receiving one of said positioning pins after said pallet support has been rotated through an angle corresponding to said regular intervals; and a crank mechanism for disengaging said positioning pin from said positioning hole when said pallet is transferred to said pallet support through any one of said pallet inlet/outlets and for keeping said positioning pin disengaged from said positioning hole while said pallet support is rotated through said angle, said crank mechanism comprising rod means which is biased so as to separate from said positioning pin and movable toward and away from said positioning pin, said rod means comprising a thin portion and a thick portion with a shoulder defined therebetween, and said crank mechanism further comprising an L-shaped link pivoted to said other one of said bed and said pallet support and having a first arm pivoted to an end of said rod means near to said positioning pin and a second arm pivoted to said positioning pin, a rockable hook lever for pushing said rod toward said positioning pin when said hook lever contacts said pallet, and a stop lever engageable with said thin portion of said rod means when said hook lever is in contact with said pallet and with said thick portion of said rod means when said hook lever is separated from said pallet.

* * * * *